US006974106B2

(12) United States Patent  (10) Patent No.: US 6,974,106 B2
Churchman  (45) Date of Patent: Dec. 13, 2005

(54) V/STOL BIPLANE

(76) Inventor: Charles Gilpin Churchman, 6360 Station Mill Dr., Norcross, GA (US) 30092

( * ) Notice: Subject to any disclaimer, the term of this patent is extended or adjusted under 35 U.S.C. 154(b) by 0 days.

(21) Appl. No.: 10/820,378

(22) Filed: Apr. 8, 2004

(65) Prior Publication Data

US 2005/0151003 A1    Jul. 14, 2005

Related U.S. Application Data

(63) Continuation of application No. 10/313,580, filed on Dec. 9, 2002, now Pat. No. 6,848,649, which is a continuation-in-part of application No. 09/677,749, filed on Oct. 3, 2000, now abandoned.

(51) Int. Cl.$^7$ .............................................. B64C 29/00
(52) U.S. Cl. ................. 244/12.6; 244/45 A; 244/23 B; 244/45 R; 244/87
(58) Field of Search .............................. 244/12.6, 35 R, 244/12.3, 13, 34 R, 45 R, 123, 12.2, 45 A, 244/103, 6, 100 R; D12/326, 327, 330, 331, D12/337, 339

(56) References Cited

U.S. PATENT DOCUMENTS

| | | | |
|---|---|---|---|
| 2,394,496 A | 2/1946 | Stephan | 244/102 |
| 2,652,215 A | 9/1953 | Brukner | 244/50 |
| 2,910,254 A | 10/1959 | Razak | 244/42 |
| 3,790,109 A | 2/1974 | Fishcher | 244/105 |
| 3,883,094 A | 5/1975 | Mederer | 244/45 |
| 3,937,424 A | 2/1976 | Meier et al. | 244/53 R |
| 4,125,232 A | 11/1978 | MacLean et al. | 244/12.3 |
| 4,795,111 A | 1/1989 | Moller | 244/23 |
| 4,796,836 A | 1/1989 | Buchelt | 244/23 |
| 4,828,203 A | 5/1989 | Clifton et al. | 244/12.3 |
| D304,821 S | 11/1989 | Ratony | D12/331 |

(Continued)

OTHER PUBLICATIONS www.moller.com/skycar/—2 pages.

(Continued)

*Primary Examiner*—Tien Dinh
(74) *Attorney, Agent, or Firm*—Sutherland Asbill & Brennan LLP

(57) ABSTRACT

The present invention is a 2 passenger aircraft capable of vertical and conventional takeoffs and landings, called a jyrodyne. The jyrodyne comprises a central fuselage with biplane-type wings arranged in a negative stagger arrangement, a horizontal ducted fan inlet shroud located at the center of gravity in the top biplane wing, a rotor mounted in the shroud, outrigger wing support landing gear, a forward mounted canard wing and passenger compartment, a multiple vane-type air deflector system for control and stability in VTOL mode, a separate tractor propulsion system for forward flight, and a full-span T-tail. Wingtip extensions on the two main wings extend aft to attach to the T-tail. The powerplants consist of two four cylinder two-stroke reciprocating internal combustion engines. Power from the engines is distributed between the ducted fan and tractor propeller through the use of a drivetrain incorporating two pneumatic clutches, controlled by an automotive style foot-pedal to the left of the rudder pedals. When depressed, power is transmitted to the ducted fan for vertical lift. When released, power is transmitted to the tractor propeller for forward flight. The aircraft can also takeoff and land in the conventional manner with a much larger payload, and is easily converted to amphibious usage. Landing gear is a bicycle arrangement with outriggers. The aircraft combines twin engines, heavy-duty landing gear, controlled-collapse crashworthy seats with a low stall speed and high resistance to stalls to eliminate any region of the flight regime where an engine or drivetrain failure could cause an uncontrollable crash.

32 Claims, 18 Drawing Sheets

U.S. PATENT DOCUMENTS

| | | | |
|---|---|---|---|
| 5,026,002 A | 6/1991 | Yarrington | 244/12.1 |
| 5,035,377 A | 7/1991 | Buchelt | 244/12.1 |
| 5,054,716 A | 10/1991 | Wilson | 244/56 |
| 5,150,857 A | 9/1992 | Moffitt et al. | 244/12.2 |
| 5,152,478 A | 10/1992 | Cycon et al. | 244/12.2 |
| 5,209,428 A | 5/1993 | Bevilaqua et al. | 244/12.3 |
| 5,277,380 A | 1/1994 | Cycon et al. | 244/12.2 |
| 5,303,879 A | 4/1994 | Bucher | 244/23 |
| 5,318,248 A | 6/1994 | Zielruka | 244/12.2 |
| 5,419,513 A | 5/1995 | Flemming, Jr. et al. | 244/12.2 |
| 5,421,538 A | 6/1995 | Vassa (Suratano Thienphropa) | 244/12.2 |
| 5,746,390 A | 5/1998 | Chiappetta | 244/12.3 |
| 5,836,541 A | 11/1998 | Pham | 244/2 |
| 5,873,545 A | 2/1999 | Kapin et al. | 244/12.3 |
| 5,890,441 A | 4/1999 | Swinson et al. | 244/12.3 |
| 5,899,409 A * | 5/1999 | Frediani | 244/13 |
| D418,805 S | 1/2000 | Cycon et al. | D12/326 |
| 6,098,923 A * | 8/2000 | Peters, Jr. | 244/45 R |
| 6,116,539 A | 9/2000 | Williams et al. | 244/46 |
| 6,170,778 B1 | 1/2001 | Cycon et al. | 244/6 |
| 6,270,038 B1 | 8/2001 | Cycon et al. | 244/12.3 |

OTHER PUBLICATIONS www.solotrek.com/tech_spec.html, 1 page.
www.vtoll.com/default.asp, 2 pages.
www.roadable.com/busi_subpage_future.htm, 2 pages.
Kuchemann et al., *Aerodynamics of Propulsion*, 1953, pp. 136-138.
Hollmann, *Modern Propeller and Duct Design*, pp. 97-99 and 102-103.
McCormick, Jr., *Aerodynamics of VSTOL Flight*, Academic Press, pp. 98-99, 234-242, 245, 254-259.
Ensing, *Hints For Homebuilders, A Handy Fixture/Stand*, Sport Aviation, Aug. 1997, p. 119.
Bushby, *Building The "Midget Mustang"*, Sport Aviation, May 1966, pp. 10-12.
Phillips, *Flying Qualities Requirements for Personal Airplanes*, Sport Aviation, Sep. 1959, pp. 20-22.
Ward, *The Skite*, Sport Aviation, Mar. 1961, pp. 14-15.

* cited by examiner

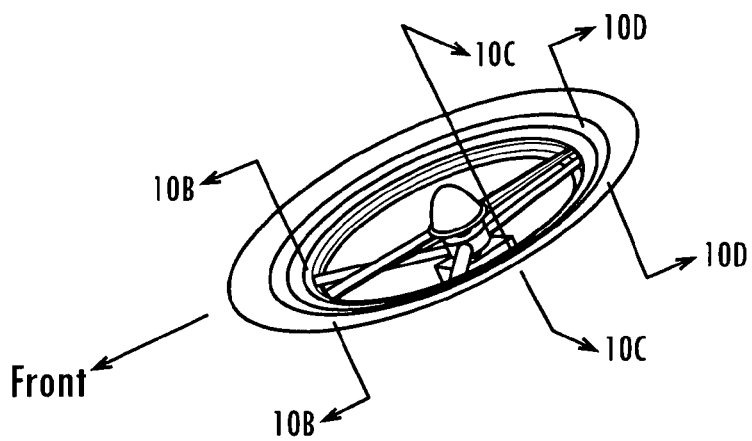
Fig. 10A
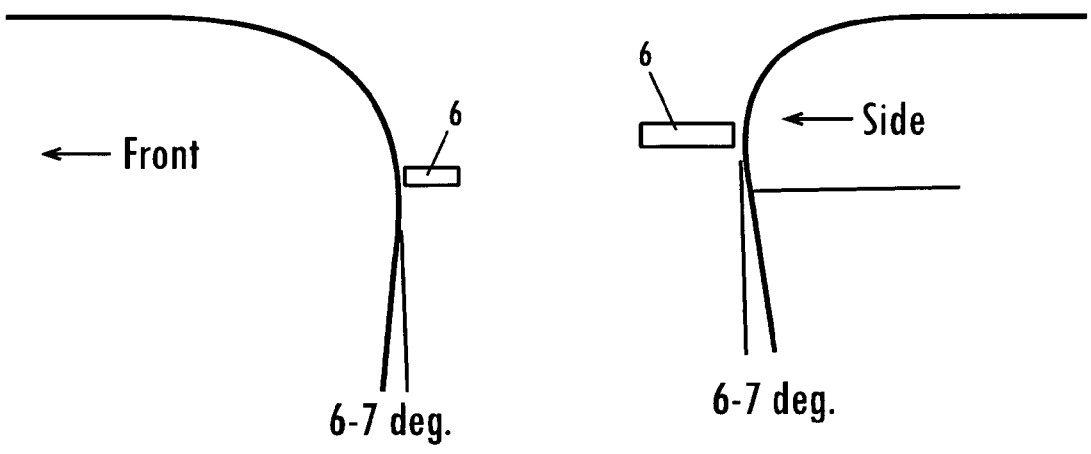
Fig. 10B
Fig. 10C
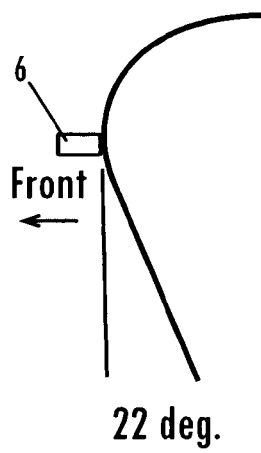
Fig. 10D

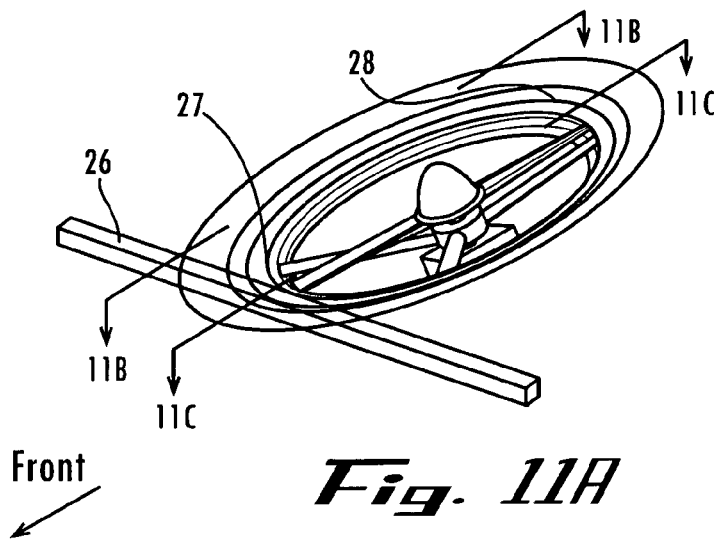
Front
*Fig. 11A*
Radius ranges from 0.1 to 0.3 duct diameter   6-7 deg.
*Fig. 11B*
6-7 deg.
*Fig. 11C*
Route of flight over personnel's heads
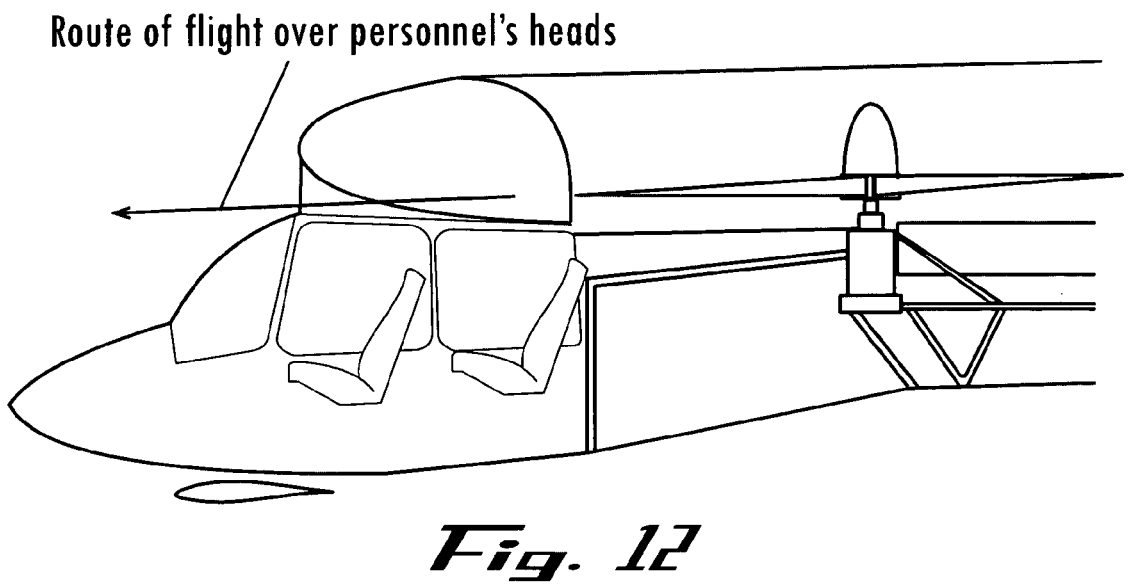
*Fig. 12*

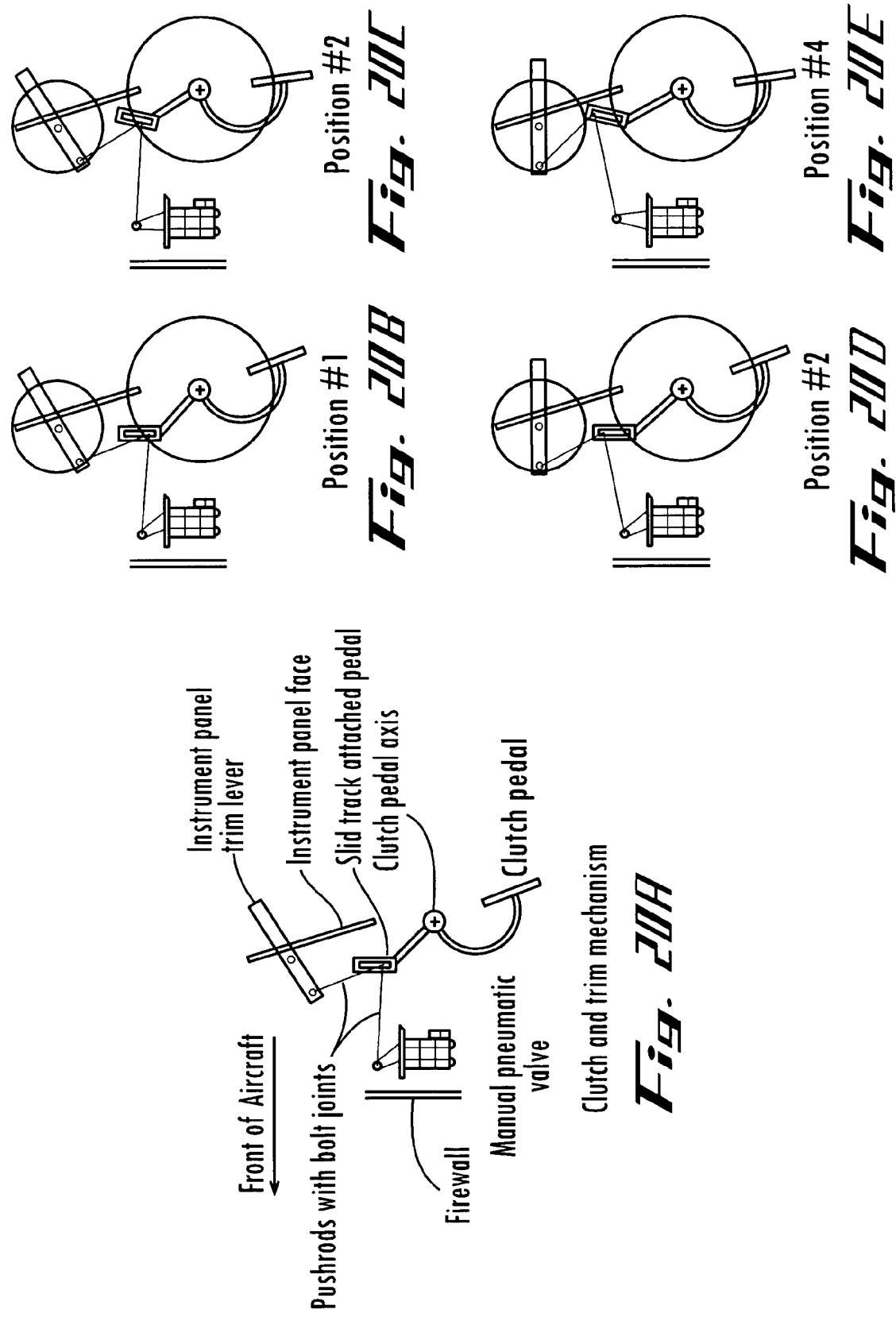

V/STOL BIPLANE

This application is a continuation of U.S. patent application Ser. No. 10/313,580 filed on Dec. 9, 2002, now U.S. Pat. No. 6,848,649, which is a continuation in part of U.S. patent application Ser. No. 09/677,749 filed on Oct. 3, 2000 now abandoned.

FIELD OF THE INVENTION

This invention relates to non-rotary wing vertical and short take-off and landing (V/STOL) passenger aircraft. Class 244/12.3 appears to be the most appropriate. More particularly, the present invention relates to a V/STOL aircraft in which the rotor plane of a single ducted fan is located horizontally inside the center of a conventional aircraft wing to provide vertical lift, with a fan diameter much greater than the fuselage width of said aircraft. An additional tractor or pusher propeller provides horizontal thrust for forward movement in the conventional manner, and is located above the rear part of the ducted fan. The aircraft utilizes two main wings in a negative staggered biplane arrangement, with an oversized stabilizer and elevator, and a canard mounted at the front of said aircraft. The ducted fan is mounted inside the top wing.

The aircraft which is the subject of this invention is called a jyrodyne, to differentiate it from gyrodyne, a generic term: 1) as in the FARs, used to describe an aircraft with dual propulsion units for vertical and horizontal flight, and 2) a gyroscopic stabilizer used on the Space Shuttle. There is also a company called the Gyrodyne Company of America, an aerospace contractor, which had a trademark, which used the name gyrodyne. The trademark has lapsed. It is with this in mind that the term is modified to differentiate this aircraft from others.

A jyrodyne is an aircraft capable of vertical takeoff and landing (VTOL) which uses dual propulsion units for vertical and horizontal flight. The jyrodyne is an integrated concept, which requires the simultaneous use of a number of newly developed technologies all working together for it to work properly. It is a special combination of a number of aerodynamic and propulsion features which taken together create a new type of aircraft.

BACKGROUND OF THE INVENTION

The history of non-rotary wing V/STOL (vertical/short takeoff and landing) aircraft development has generally proceeded along two separate paths. STOL (short takeoff and landing) aircraft development has centered on conventional aircraft operation, using enhanced lifting devices to shorten takeoff and landing runs. VTOL aircraft development has centered on the use of powerful jet engines to provide the required vertical thrust, and as such has focused on military applications. Latest developments, such as the Osprey aircraft being procured by the US Marines, use two widely spaced proprotors, similar to large propellers, but without shrouds or ducts. These proprotors rotate during flight approximately 90 degrees, from a horizontal to a vertical position to transition from vertical lift to horizontal thrust. The proprotors are too large in diameter for the plane of the rotors to be rotated to a vertical position when sitting on the ground.

Rotary wing aircraft, such as helicopters, have had more commercial success than the military designs, but still rely predominately on turbojet engines to provide the power for vertical lift. Their advantage in vertical lift capability is offset by their poor flight stability characteristics, and very high initial and maintenance costs.

STOL Designs

STOL designs reduce the takeoff and landing runs for aircraft by primarily reducing the stall speed of the aircraft. This is accomplished by increasing either the available wing lifting area or increasing the lift coefficient the wing is capable of producing, by means well known to practitioners of the art. Regardless of the design. STOL aircraft must provide forward movement of the aircraft in order to produce lift, with the notable exception of the Custer channel-wing aircraft, which could lift vertically while tethered.

STOL aircraft have the potential to be particularly safe aircraft, since there is a direct relationship between the severity of injuries sustained in crashes and the speed at impact. With a lower potential impact speed due to lower stall speeds, STOL aircraft can be designed to provide complete protection from injury in most crash landing situations.

VTOL Designs

Helicopters

Helicopter designs fall into two broad categories; a single lift rotor with a tail rotor to control yaw, and two lift rotors rotating in opposite directions to control yaw. The single lift rotor is much more popular since it is simpler, but it yields roughly 30% less direct vertical lift for a given horsepower than the dual rotor system. Typically, helicopter rotor systems provide a lifting capability of 10–15 pounds per horsepower, with top speeds in horizontal flight of less than 200 miles per hour.

The flight and maintenance problems associated with helicopters are well known and bear no repeating. Their disadvantages are detailed below in the section on Disadvantages of the Prior Art.

Autogyros and Gyrocopters

Autogyros provide for lift using an unpowered overhead rotor system similar to the helicopter, with auxiliary wings to provide supplemental lift. Gyrocopters do not have auxiliary wings. Most designs provide pusher propellers as the primary means of propulsion. The Cartercopter is a recent example.

Current gyrocopters provide prerotors to spin up the main rotor system to high speed, and then use a "jump" takeoff to lift almost vertically. The gyroscopic inertia of the main rotor is used to lift the aircraft into the air, where it then accelerates forward using the pusher propeller. Once moving forward, the rotor speed is maintained by contact with the moving air. Gyrocopters with prerotors do not have hovering capability in a loitering mode.

Tilt Rotor (Proprotor) Aircraft

This type of VTOL aircraft provides two or more very large propellers mounted on wingtips or wing pylons. The propellers rotate through over 90 degrees of angle, from a horizontal axis for forward flight, through to a vertical axis for vertical lift thrust. Due to the need for redundancy in case of a single engine failure, complex crossover shafting is required. Current aircraft of this type are military, with smaller civilian versions in the planning stages. These aircraft have lower thrust output for a given horsepower than helicopters, but have the capability to exceed 300 miles per hours in horizontal flight.

Direct Lift Aircraft

Ducted Fans

VTOL aircraft using ducted fans have been the most commonly developed prototype, but with little success. While the ducted fan provides greater lift than a simple unducted propeller, the drag produced by the duct shroud in forward flight at speeds over 150 mph has greatly limited the success of this type of VTOL aircraft.

One of the best examples of the ducted fan type of VTOL aircraft is described in U.S. Pat. No. 5,454,531. This aircraft consists of three ducted propeller assemblies consisting of one primary and two control propellers mounted in a triangular fashion. The assemblies are canted with respect to the aircraft fuselage by 45°. For vertical lift, the airstream is deflected an additional 45° downward to produce vertical thrust, and then once airborne, the deflectors rotate the airstream through 90° to the rear to produce forward thrust.

This aircraft has a number of disadvantages, which are discussed, in the following section entitled, "Disadvantages of the Prior Art".

There are numerous fan-in-wing configurations, which have been patented, but none has proved to be successful. The primary problem has been the high required disc loading causing high exhaust velocities. A good example is illustrated in U.S. Pat. No. 3.083,935, Piasecki, where fans are located in each wing, with the wings having a retracting feature to cover the fans in forward flight.

Deflected Thrust

The greatest military success in VTOL aircraft has come with this alternate, in the form of the Marine Corps Harrier. Other aircraft, including the Moller SkyCar and Soltrek XFV, are in flight testing. The Skycar uses eight separate engines in four deflected thrust lift pods to provide both vertical and horizontal thrust.

Many of the VTOL designs have the capability of STOL operation. In particular, the Harrier is used by the British with a jump takeoff ramp on aircraft carriers to enhance range and payload.

Disadvantages of the Prior Art

Mentioned earlier, one of the best examples of the ducted fan type of VTOL aircraft is described in U.S. Pat. No. 5.454,531. Its disadvantages are typical of those found in the prior art, and include:
1. Excess complexity—there is no need for three separate propellers to provide adequate pitch, roll and yaw control. Sikorsky followed the same chronological development, with three rotors on his first helicopter, and went to a single rotor for production units. The sensitivity to these multiple rotor systems to control inputs is so high that control instability usually results. Early jyrodyne radio-controlled models had three rotors, and had a severe tendency to flip on takeoff in VTOL mode.
2. High power requirements—the location of the passenger compartment directly above the propeller interrupts the entering airflow reducing efficiency, and the disc diameters are small, reducing the thrust to horsepower ratio.
3. Low thrust efficiency—radio controlled modeling tests on deflected airstreams were performed as part of the research on the jyrodyne, and showed that a 45° deflection in an airstream reduces the thrust by from 30 to 50% depending on its configuration.

A more general discussion of the disadvantages of the prior art follow, which help to illustrate the current state of the art which the jyrodyne is designed to enhance.

Propulsive System Failure

For VTOL aircraft propulsion system failure when in VTOL mode results in serious crashes. The ability of a helicopter to autorotate is limited to a narrow band of airspeed and altitude during takeoff and landing. A vertical descent by a helicopter below approximately 500 feet at zero forward airspeed will generally result in a crash if the propulsion system fails. The basics physics of safe helicopter ascent profiles usually require acceleration to 50–60 mph at very low altitudes before climbout can occur. Such profiles are not practical in urban environments, and thus result in routine helicopter takeoff and landing operations where a propulsion failure does not allow for a safe landing.

Propulsion failure in a conventional single engine aircraft does not necessarily result in a crash from any altitude as long as the stall speed of the aircraft is maintained, and unusual attitudes during gliding flight are avoided. However, the high landing speeds and poor braking capability of the wheels usually results in aircraft damage and often results in injuries.

Rotor System Failure

Rotor systems are highly stressed mechanical devices, typically with many moving parts and critical fasteners. These components have lifetime limits and require frequent routine inspection and maintenance. A failure of a component of these systems usually means a loss in control of the aircraft, unlike conventional propeller aircraft, where a failure in a propeller does not cause failure in the flight controls of the aircraft.

In gyrocopters, negative G maneuvers can cause the rotor blades to slow down and strike the tail assembly, invariably resulting in crashes and fatalities.

Excessive Mechanical Complexity

The rotor head, transmission, tail rotor and ancillary linkages that are an essential part of helicopters are complex mechanical devices that require frequent and intensive maintenance. In normal commercial operations, it is not unusual for two or more hours of maintenance being required for each hour of flying.

Limited Service Life of Major Components

The highly stressed parts in helicopters and gyrocopters reach fatigue limits relatively quickly, and thus have defined service lives which when reached require replacement. In a helicopter with 2000 hours of service or less, all the major components of the drive train and rotor system must be replaced. This results in creating an essentially new helicopter with new parts every 2000 hours, with the associated expense.

Exposed Rotor Systems

Helicopter and gyrocopter rotor systems are exposed to impact with any object in its flight path without hindrance. Flight by a helicopter close to objects on the ground is dangerous due to the velocity of the rotor and the loss in flight control if the rotor is damaged through contact.

Excessive Velocities and Temperatures of Thrust Discharges from Vtol Aircraft

While the downward thrust of airflow through a helicopter rotor is relatively low, the downthrust from many VTOL aircraft is sufficient to force chunks of turf, rocks and gravel to be thrown at high velocities out away from the aircraft.

These projectiles can cause considerable damage to property, and potential harm to nearby onlookers.

Direct exhaust from jet engine deflected thrust can exceed 1000° F., and singe and burn turf and scorch paint and melt asphalt.

In both cases, the assumption has been made in these VTOL aircraft designs that the disk loading of the ducted fan must be determined by a rotor diameter which is limited either by the diameter of the aircraft fuselage, or the external wing of the aircraft. In both cases, this limits the diameter of the ducted fan to a small value, and conversely, forces the disk loading to a high value.

Limitations on Ranges in Center of Gravity

For single rotor helicopters, particularly small ones, changes from single pilot to pilot/passenger payloads results in some shift in the center of gravity. In at least one helicopter, this requires the relocation of a lead weight from the front of one skid to the rear of another. The relocation of this lead weight compensates for the center of gravity shift due to the added weight of the passenger.

Generally, the flybars on some helicopter rotors are limited in their ability to counteract for this due to their small surface area and short distance from the rotor head.

Inability to Glide

Unlike conventional aircraft, an engine failure in conventional rotorcraft results at best in a very steep autorotational descent. For the Osprey, the glide is steep, and the landing speed high, with proprotor damage probable. In both cases, the selection of a landing site is limited both in distance that can be traveled, and time for the site selection. Some of the fan-in-wing designs had limited gliding ability, but generally the wings were small and heavily loaded.

Limited Maximum Top Speed

For single rotor rotorcraft, the advancing blade must remain below supersonic velocity to keep the noise level acceptable, and the retreating blade must maintain a net rearward velocity sufficient to create significant lift.

Insufficiently Sized Aerodynamic Control Surfaces for Transitional Flight

All of the current VTOL designs utilize control surfaces that are very similar in size to those required for conventional aircraft. These include the stabilizer and fin areas, as well as the aileron and rudder areas. This includes a number of patented designs, where the focus was on vertical lift and hover control, and where the special aerodynamic conditions of the initial conversion from hover to forward flight were not adequately addressed until very recently. This includes U.S. Pat. No. 5,035,377, where the conventional flight control surfaces are almost non-existent; U.S. Pat. No. 5,026,002, where the fin area for yaw control is almost non-existent, and what is there is forward of the center of lift and thus destabilizing; U.S. Pat. No. 5,303,879, which provides insufficient stabilizer area to offset the shift in the center of lift of a ducted fan when moving forward: U.S. Pat. No. 5,054,716, with a similar lack of area for both stabilizer and fin: U.S. Pat. No. 5,209,428, sized for high speed jet flight, and not for low speed stability: and U.S. Pat. No. 4,828,203, which provides enough fin and stabilizer area, but not enough area for wing lift to affect a low speed transition to forward flight.

Recently, a series of patents by Cycon et al., assigned to Sikorsky Aircraft (United Technology Corporation) began to address the particular issue of pitch up. These patents include U.S. Pat. Nos. 5,150,857, 5,152,478, 5,277,380, 5,419,513, 6,170,778, 6,270,038 and Design Pat. No. 418,805. This series of patents for unmanned aerial vehicles (UAVs) incorporate a series of improvements in aerodynamic control of ducted fans during forward flight.

Since the VTOL designs must transition from hover to forward flight, they will be in the air at very low forward speeds. At these low speeds, the aerodynamic control surfaces on these existing VTOL designs are ineffective, The jyrodyne, by comparison, has unusually large control surfaces to make effective use of these for aerodynamic control at the very low forward speeds of the transitional flight region.

Poor Conversion of Horsepower into Thrust

The conversion of engine horsepower to vertical thrust is the key to VTOL flight. Most of the existing VTOL systems convert horsepower into thrust at a ratio of 5 to one or less, with the exception of some helicopters with low disk loadings.

ADVANTAGES OF THE INVENTION

This invention provides for an exbedded, rather than an imbedded ducted fan to provide vertical lift. In this case the term "exbedded" indicates that the ducted fan rotor diameter extends beyond the outside diameter of the fuselage into the wings of the jyrodyne. The wings are integrated with the exterior edges of the ducted fan inlet shroud for the top wing, with a larger central and circular cutout for the bottom wing. This innovation allows the disk loading to be reduced to a value not much higher than a helicopter disk loading, thus reducing the ducted fan outlet airflow velocity to in the neighborhood of 80 mph.

Another advantage is that the axis of the single exbedded ducted fan rotor, as shown in FIG. 3, is along a vertical line illustrated by arrows 4 and 8. The axis is located at the point in space that also is at the combination of the two centers of lift of the individual biplane wings. This is called the jyrodyne center of lift, and is a center of lift for both the VTOL and conventional flight modes the jyrodyne is capable of. Thus, during transition from vertical lift to forward translational lift, there is no shift in the center of lift for both VTOL and translational flight. A shift in the center of lift would cause a substantial pitch effect, which would be undesirable.

Another advantage is that as an enclosed ducted fan, there are no exposed rotating parts that can contact stationary objects. This provides the jyrodyne with the ability to land in areas unavailable to helicopters or other rotorcraft with exposed rotor systems or to hover close to high-rise buildings. In the latter case, rescue operations are possible.

Another advantage is the preferred embodiment can be used as amphibious aircraft. The conventional tractor or pusher propeller location is above the jyrodyne in a position often used in amphibious aircraft. This allows conversion of the jyrodyne to amphibious service with only the installation of pontoons outboard of the exbedded duct, in a manner well known to those skilled in the art.

Another advantage is the low stall speed of the jyrodyne in conventional flight mode, which allows a transition to sustainable forward flight in less than 3 seconds. This can eliminate the period after a VTOL takeoff where a power failure could cause an uncontrolled crash rather than a controlled forced landing at above the stall speed.

Another advantage is the ability of the jyrodyne to take off and land in a conventional mode of flight like a regular airplane. In this mode, the payload capacity of the jyrodyne is greatly enhanced.

Another advantage results from the use of both staggered biplane wings and a canard, which provide exceptionally benign stall characteristics, particularly during the transition period at low forward speeds.

Another advantage is the simplicity of the VTOL drivetrain and control systems. These are relatively lowly stressed and simple mechanical components, with concomitant minimal maintenance requirements.

Another advantage is the ability to glide like a conventional aircraft or for that matter, a glider. The jyrodyne configuration lends itself to a simple increase in the apect ratio of the wings beyond that depicted in the Figures for the preferred embodiment which decreases the jyrodyne descent rate if desired, and increases the miles traveled per mile of descent. The sidefins between the two biplane wingtips tend to reduce induced drag effects so that a descent at low airspeed has less impact on the descent rate than a conventional aircraft.

Another advantage applies during the short transition from VTOL to conventional flight. The location of the tractor or pusher propeller above the rear of the ducted fan shroud inlet bellmouth provides a strong compensating effect against the pitching up tendency of ducted fans when moving forward.

Another advantage is the reduction in the fuselage frontal area assigned to the ducted fan found in other patents such as the machine by Kaplan et al. in U.S. Pat. No. 5,873,545. The prior art has focused on duct lengths which are a significant percentage of the duct diameter. FIG. 5 in U.S. Pat. No. 5,152.478 illustrates the conventional approach where the length of the duct is made as long as possible compatible with the fuselage depth. The reason for this is to minimize the recirculation of the ducted fan exhaust back into the inlet to the bellmouth. The Kaplan patent is a good illustration of the current practice.

This assumption forces a substantial increase in the aircraft frontal area, since the duct is imbedded in the fuselage. The jyrodyne requires almost no increase in the fuselage frontal area since the ducted fan is enclosed in the top wing. Recirculation of the exhaust is prevented by the top wing, obviating the need for a long duct. The concept of the exbedded fan which is presented in this patent application is novel and new.

Another common assumption, evidenced in FIG. 4 of patent U.S. Pat. No. 5,152,478, is to increase the radius of the inlet bellmouth, but it has been assumed in that patent that beyond 0.04–0.06 lip radius/duct diameter little extra lift is obtained. The longer lip radius of the bellmouth on the inlet lip of the ducted fan shroud of the jyrodyne extends to as much as 30% of the duct diameter. Desirably, the ducted fan shroud bellmouth has a radius of from 0.1 to 0.3 times the ducted fan diameter. This is done for two reasons: 1) to increase the Figure of Merit to ~0.9 as shown in the other line shown said FIGS. 4, and 2) to capture more of the suction lift at the periphery of the bellmouth inlet.

The extra suction lift generated by the bellmouth periphery of ducted fans is a generally understood concept in aircraft, and dates back as far as the German work on the ME-262 during World War II. However, in almost all cases, the full amount of extra static thrust which can be achieved has been limited by the need to minimize the frontal area of the bellmouth. Since the frontal area has a significant drag impact in forward flight, there has always been a tradeoff in the increase in static thrust offered by a larger radius bellmouth, with the reduced forward flight drag of a smaller radius bellmouth. In general, the radius used has been less than 7% of the duct diameter.

This is not a problem with the jyrodyne, and allows a much larger radius to be used for the bellmouth than is used in conventional ducted fan shrouds. With the jyrodyne, the ducted fan shroud bellmouth lies perpendicular to the airflow over the aircraft, and extends out over the top surface of the top wing to a considerable distance. In conventional HVAC applications, isokinetic profiles around duct inlets are well known, and show significant inflow velocities as much as 30% beyond the outer diameter of the inlet duct. Thus, out to 30% of the duct diameter beyond the duct bellmouth, the inflow of air has sufficient velocity to create suction lift. The jyrodyne captures almost all of this available extra lift available from suction bubble formed over the ducted fan shroud inlet.

The last advantage is the most important and the newest advance in the state of VTOL aircraft design. By placing the ducted fan in the center of a larger relatively flat top wing surface, the ducted fan creates a large bubble of low pressure that extends out well beyond the edges of the bellmouth entrance. The lower pressures created are impressed upon the top wing surface, and have two important effects. First, the VTOL lift is enhanced and second, wing lift on the wing immediately adjacent to the ducted fan is enhanced. This feature is described in more detail in the sections that follow.

OBJECT OF THE INVENTION

It is an object of this invention to provide an aircraft with V/STOL capabilities that is relatively inexpensive to manufacture, operate and maintain.

It is a further object to provide an aircraft V/STOL capabilities which has an easy learning transition for a pilot trained in conventional aircraft.

It is another object of the present invention to provide a V/STOL aircraft with a much higher degree of personnel safety than existing designs, through the use of a new combination of features, which include an enclosed rotor system, twin engines, low stall speed, heavy duty four point landing gear, structural passenger cage and collapsible seats.

It is another object of the present invention to provide a V/STOL aircraft with a lower discharge airflow velocity and temperature than current VTOL aircraft to avoid throwing objects against property or persons during VTOL takeoffs and landings.

It is another object of the present invention to provide a V/STOL aircraft with a flight characteristics that provide for safe emergency landings in case of complete propulsion failure regardless of altitude or airspeed.

These and other objects and advantages of the present invention will become apparent from a reading of the attached description and appended claims.

SUMMARY OF THE INVENTION

Referring to FIG. 1, the present invention is a 2 passenger V/STOL aircraft called a jyrodyne, comprising a central fuselage, 100, with two biplane-type wings, 101 and 102. The biplane arrangement consists of a top wing, 101, and a bottom wing, 102, arranged in a negative stagger arrangement. The bottom wing is mounted forward of the top wing. Other features of the invention include: an exbedded horizontal ducted fan inlet shroud, 103, and ducted fan, 111, located at the jyrodyne center of gravity inside the top wing to provide vertical thrust, midriggers. 104, and outrigger landing gear, 105, sidefins 112, a forward mounted canard wing, 106, a vane-type air deflector system for control and stability in VTOL mode, 110, a separate propulsion system for horizontal flight, 107, a full-span T-tail, 108 and a large, single maingear, called the nosegear, 113.

BRIEF DESCRIPTION OF THE SEVERAL VIEWS OF THE DRAWING

FIGS. 10A-10D illustrate the different tapers used for the front, side and rear of the ducted fan shroud

FIG. 12 shows the route of flight of a failure in the ducted fan rotor blade, over the heads of the passengers and pilot.

FIG. 17 depicts the drivetrain and drivetrain components used in the jyrodyne FIGS. 20A-20E illustrate the clutch adjustment mechanism to use for clutch wear adjustment

DETAILED DESCRIPTION OF THE PREFERRED EMBODIMENT

Figure 2:
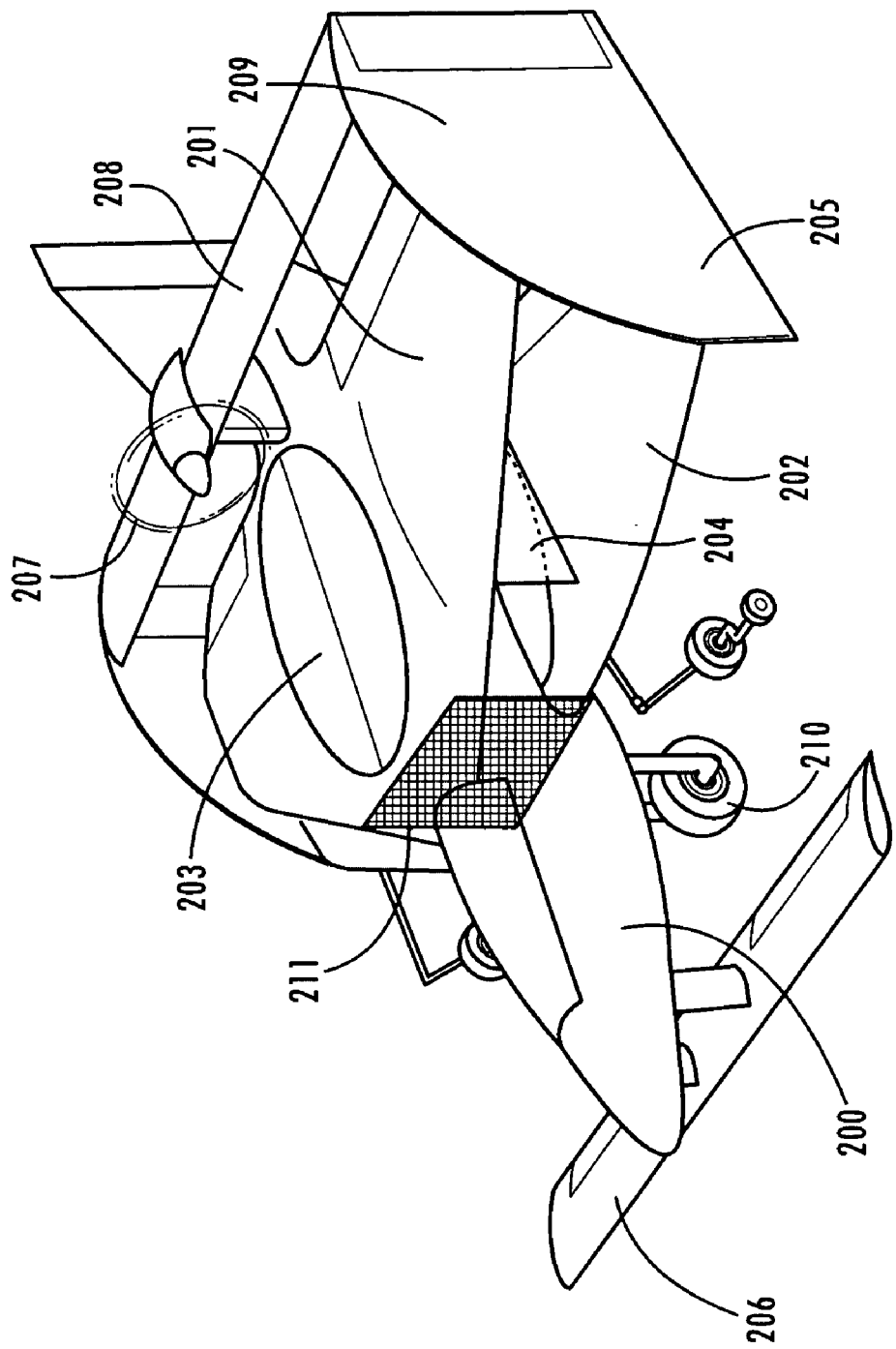
FIG. 2 is the same oblique view with cross-hatching to illustrate the separation of the front and middle sections of the fuselage.

Referring to FIG. 2, the fuselage, 200, consists of three distinct sections. These are the front fuselage section, the middle fuselage section and the rear fuselage section These three sections are indicated as 1 for the front fuselage section 2 for the middle fuselage section and 3 for the rear fuselage section.

Weight and Balance Considerations

Figure 3:
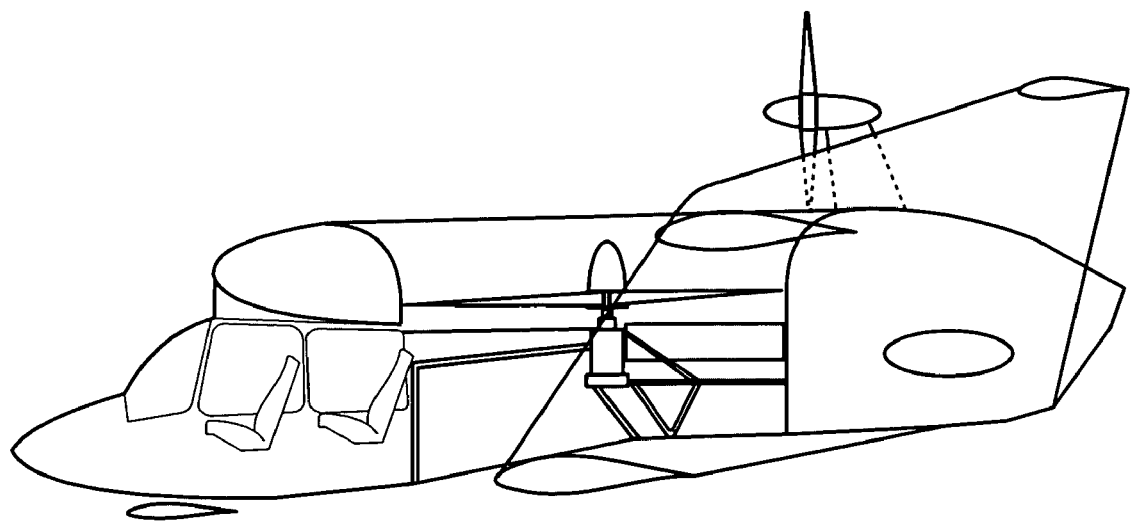
FIG. 3 is a side view cut-away of another version of the jyrodyne, illustrating weight and balance information.

FIG. 3 illustrates a side view of another version of said jyrodyne aircraft, with the center of gravity vector depicted by arrow 4, at a position directly below the center of combined wing lift from the two biplane wings, arrow 8, which is called the jyrodyne center of lift. Said vector at arrow 4, also resides at the same longitudinal position as the ducted fan rotor axis. In stable hover mode, this point also resides at the jyrodyne center of gravity. Thus, this vendor resides at the combined location of the jyrodyne center or lift and gravity, called the jyrodyne center of lift/gravity. The ducted fan rotor hub is illustrated just below the start of the arrow that goes up to 8. The center of lift of each of the airfoils used in the jyrodyne occurs at approximately 25% of the distance along the airfoil from the leading edge to the trailing edge, or as is described conventionally, at the airfoil 25% chord point.

As it may be seen in profile, the bottom wing lift occurs at its 25% chord point with the lift vector for the bottom wing depicted as arrow 7. The lift vector for the top wing is depicted as arrow 9. It may be noted that said bottom wing lift vector is located ahead of said jyrodyne center of lift/gravity. Said top wing lift vector depicted by arrow 9 is located slightly further behind said jyrodyne center of gravity/lift than said bottom wing lift vector is ahead of the center of gravity/lift. Since the two biplane wings have almost exactly the same lifting area, in order for the moment arm of the wings times the lift of the wings to be balanced between the top and bottom wings of the jyrodyne, the coefficients lift for the bottom wing must be slightly higher than for the top wing. This forces said bottom wing to operate at a slightly higher angle of attack than said top wing, and thus will cause said bottom wing to stall first, which is a desirable characteristic. Since said bottom wing is located forward of said top wing, when said bottom wing stalls the nose of the jyrodyne will tend to drop, which is what happens in a conventional aircraft, and is what pilots are used to experiencing during a stall.

Further, the bottom wing contains the flaps, and the top wing contains the ailerons. Deployment of the flaps usually occurs during landing approach. Said flap deployment increases the lift of said bottom wing, and thus causes a pitch-up of said jyrodyne, since the increased lift occurs ahead of said jyrodyne center of gravity. This is commonly experienced in conventional aircraft, and is also a desirable characteristic. Last, the deployment of flaps generally causes said bottom wing airfoil to stall at a lower angle of attack, which increases the tendency of the bottom wing to stall first again, a desirable characteristic.

It is a common characteristic but not a well understood problem in aircraft with ducted fans that they produce extra lift along their leading edge during transitional flight from the hover to forward flight and vice versa. This effect is most pronounced in the front quadrant of the ducted fan shroud inlet bellmouth, and is thus herein called "extra front quadrant lift". During takeoff transitions, this is caused by the accelerating velocity of the air moving toward the duct from the front of the jyrodyne as it moves forward. The combination of the increasing forward movement of said jyrodyne and the suction of the ducted fan cause this. This increased velocity generally produces extra lift, and is depicted in FIG. 3 as arrow 12. At the rear quadrant of said bellmouth, just the opposite occurs, as the jyrodyne forward movement and the duct suction work against each other. This results in reduced lift at the rear of said bellmouth. At one point as the jyrodyne accelerates, the velocity of air at the rear of the duct goes through zero, and produces no lift. This condition is called "transitional null velocitv", and results in a no lift condition at the top wing surfaces at or near said rear quadrant of said bellmouth. The reduced lift at the rear quadrant section of said bellmouth is called "reduced rear quadrant lift".

Most of the patents mentioned earlier in the section entitled, "Insufficiently Sized aerodynamic control surfaces for transitional flight", which issued with central ducted fans, do not adequately address this characteristic with their conventional aerodynamic surfaces. Said extra front quadrant lift acts over a much longer moment arm than that experienced with conventional airfoils. The same longer moment arm also applies to the reduced rear quadrant lift particularly at said transitional null velocity. The moment arm of the increased lift at the front of the ducted fan, combined with the long moment arm applied with reduced lift at the rear, create a very strong pitch up effect which can overwhelm conventionally-sized aerodynamic controls on both the ducted fan and the elevator or canard.

There is an additional problem besides the moment arm-related pitch up tendency caused by the front quadrant lift and reduced rear quadrant lift when at or near said transitional null velocity. This is that said front quadrant lift does not stall out until angles of attack of 35–40 degrees are reached. If not caught quickly, said pitch up effect will accelerate the jyrodyne angle of attack beyond normal airfoil stall angles, and both the jyrodyne biplane wings and the jyrodyne "T"-tail will stall before front quadrant lift diminishes. This happened in several radio-controlled models of the jyrodyne and caused several takeoff crashes, where the biplane wings and tailplane stalled before the front quadrant lift of the ducted fan shroud inlet bellmouth reached its stalling angle of attack.

Referring again to FIG. 1, the very wide span "T" tail of the jyrodyne is designed to compensate for said front quadrant lift, by producing extra lift at a distance well behind said jyrodyne center of lift. The large amount of lift produced may be further helped by the canard, at 1, which can be used to create an additional downward thrust if necessary, should the stall angle of the tailplane be approached. Neither the canard nor tailplane lift characteristics are included in said jyrodyne center of lift calculations.

Forward movement of the jyrodyne in conventional flight mode, utilizes the conventional tractor or pusher prop, which produces a thrust vector noted as arrow 11 in FIG. 3.

Descriptions of the Front, Middle and Rear Sections of the Fuselage

Referring again back to FIG. 2, said front fuselage section of said jyrodyne, consists of a conventional layout for a four passenger compartment, 200, as in conventional pusher-propelled propeller aircraft. The jyrodyne can carry three passengers and a pilot in conventional flight, but only two in VTOL flight. Side by side or tandem layout is possible, although the side-by-side layout is preferred for training purposes. The nosewheel, 210, is contained in said front fuselage section.

The rear end of said front section of the fuselage is defined as a vertical perpendicular bulkhead located at the front edge of a retractable cover for the ducted fan inlet shroud, 203. This bulkhead is depicted in the cross-hatched area. 211. Besides containing the passenger compartment and said nosegear, the pilot controls and instrumentation are located in said front section, in the conventional manner. The one exception a completely conventional arrangement of pilot controls is the clutch activation arrangement to switch engine power between the ducted fan rotor and the conventional propeller used for forward flight. This is described in more detail in a later section of this patent application.

Middle Section

Figure 4:
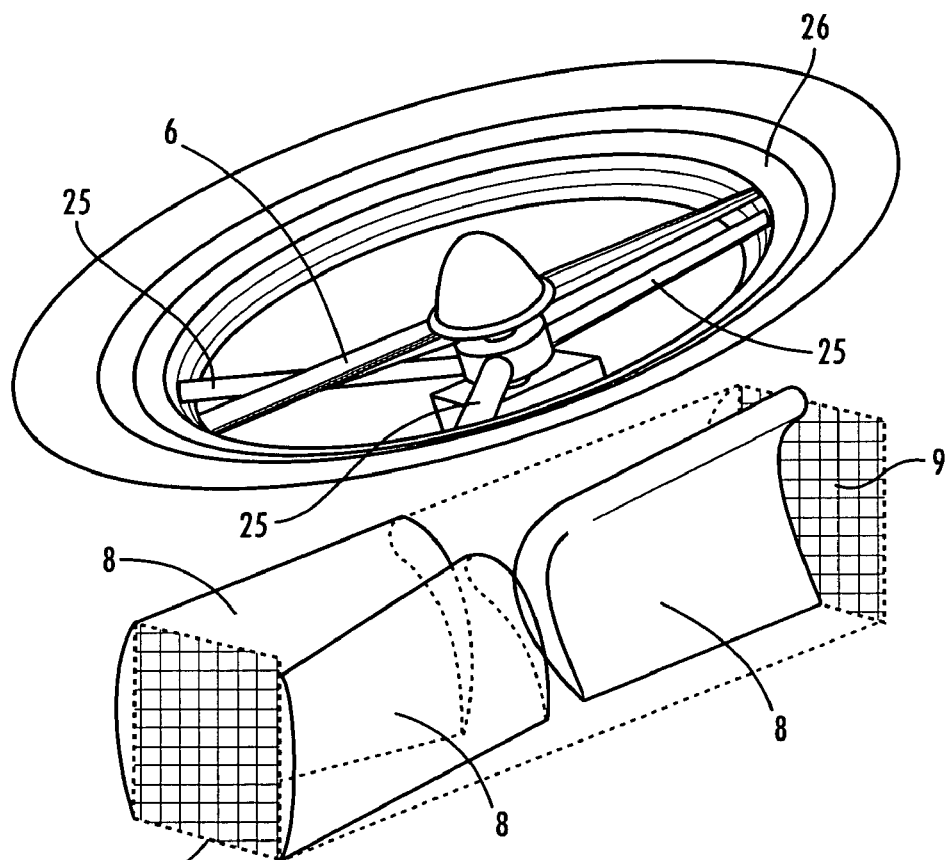
FIG. 4 illustrates the rotor, bellmouth and anti-torque airfoil vanewings.
Figure 5A:
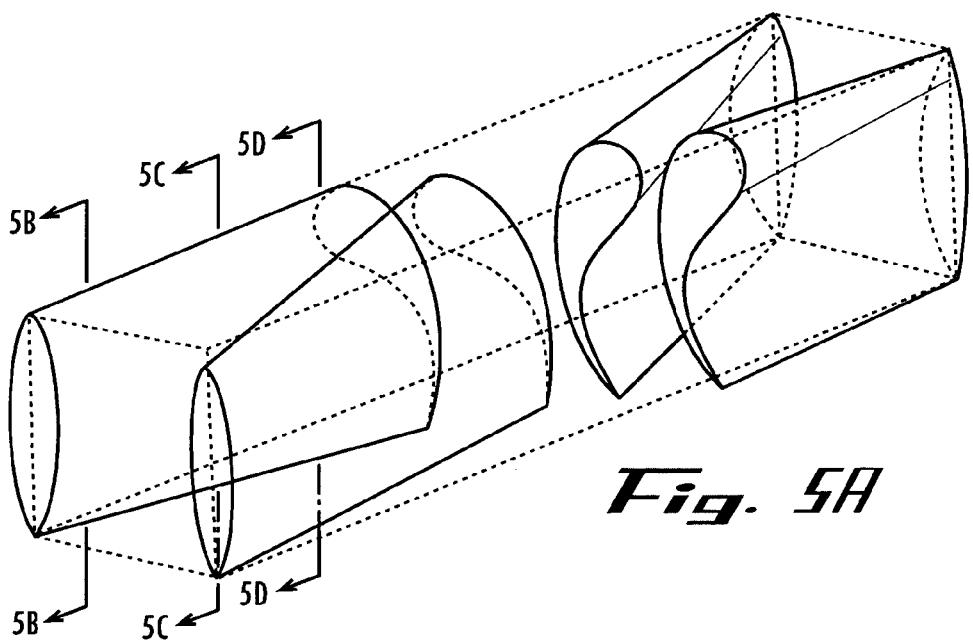
FIGS. 5A-5D illustrate cross sections of the vanewing airfoils.
Figure 5B:
Figure 5C:
Figure 5D:
Figure 15:
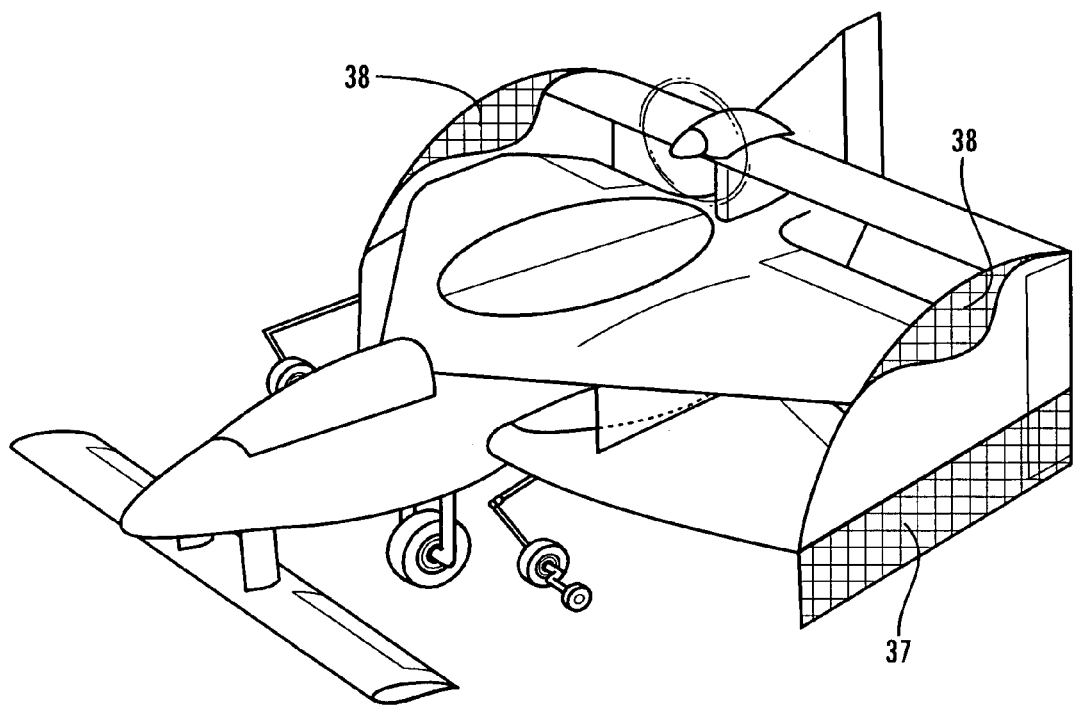
FIG. 15 illustrates the "S" shaped cutout and dorsal fin extension on the sidefins.
Figure 16:
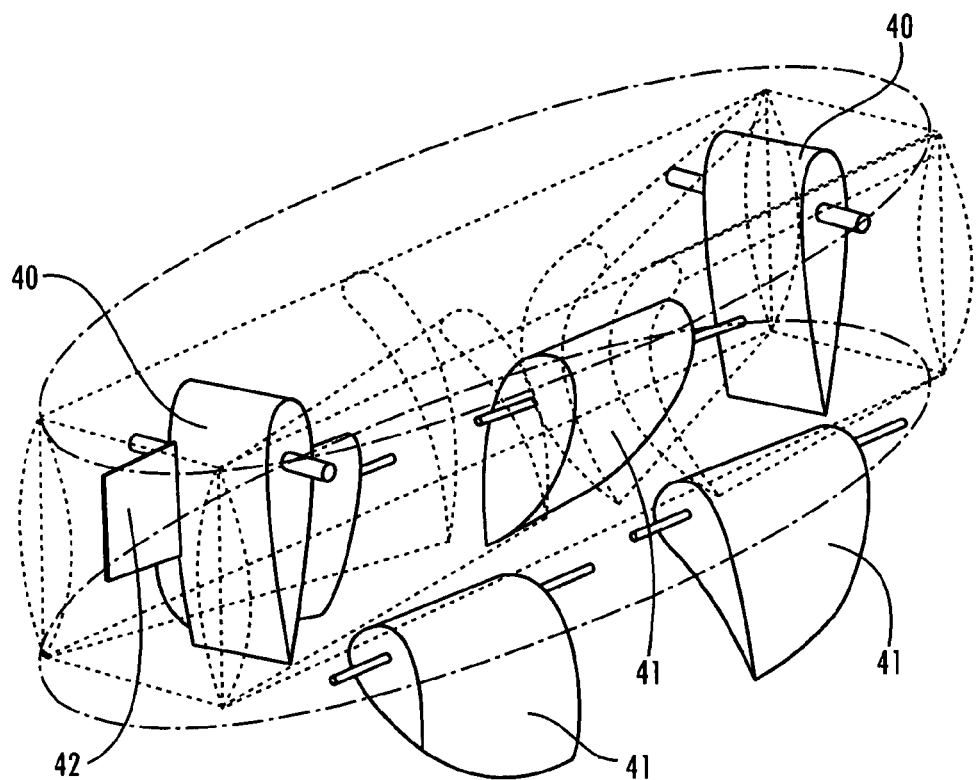
FIG. 16 shows the control surfaces used for control in VTOL flight.

The middle section of said fuselage is illustrated in FIG. 4. The middle section extends from said rear vertical bulkhead of the front section, illustrated as 10, to the front slanted bulkhead of said rear section, 9, and contains six main components. The six main components are:
1) the ducted fan rotor, 6;
2) supports to anchor the rotor mounting hub to said ducted fan shroud, 25,
3) the ducted fan inlet shroud, 26;
4) separate airfoil contoured vertical walls, 8, called vanewings, extending from the rearmost vertical sides of the front fuselage section, 10, to the ducted fan rotor hub, and then from the ducted fan rotor hub back to said front slanted bulkhead of the rear fuselage section, 9. In FIG. 4, three of said vanewings are depicted, but four may be used in some jyrodyne configurations.
5) Referring to FIG. 15, aerodynamic control vanes located between said fuselage and said midriggers, which act to during the VTOL mode of flight. These are illustrated in FIG. 16, pointed to as items numbered 41. Said control vanes are used for yaw and roll control of the jyrodyne while in VTOL mode. They are described in more detail in the section which follows entitled, "Exbedded Airpath Roll/Yaw Control Vanes".
6) the forward part of the drivetrain truss, which extends directly under said ducted fan rotor mounting hub Said middle section is a primarily hollow section, providing free passage of air directed downward by the ducted fan rotor. The vanewings, 8, are contoured into an airfoil shape to provide a horizontal thrust producing an anti-torque opposite to the torque produced by the ducted fan rotor, which is described in more detail below.

Referring to FIGS. 5A-5D, said vanewings of said middle section are three to four in number. In the preferred arrangement, there are two front vanewings and one rear vanewing. The drivetrain truss is enclosed inside said rear vanewing. The said front and rear vanewings when taken as a vertical section view consist of cross sections of airfoil shape, as may be seen in FIGS. 5A-5D. The camber of the vanewing airfoils and their angle of attack with respect to the vertical, become more pronounced as the section cut approaches said ducted fan rotor hub.

Figure 6A:
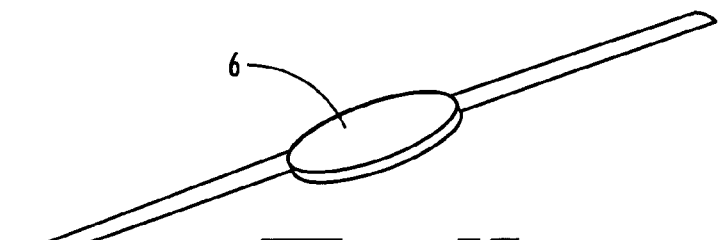
FIGS. 6A and 6B illustrate the aileron-like extensions at the bottom of the vanewings.
Figure 6B:
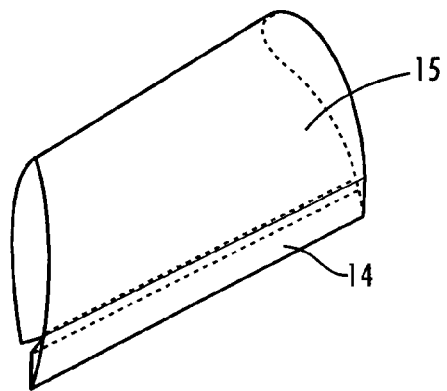

Referring to FIGS. 6A and 6B, these airfoil shaped vanewings also contain ailerons, 14, attached along their bottom edges in a fashion similar to an aileron on a conventional wing. Only one vanewing is depicted in FIGS. 6A and 6B for illustrative purposes, but all three to four vanewings mount said ailerons. Said vanewing ailerons assist the airfoil cross sections of the said three middle section vanewings to provide a counteracting torque effect to compensate for two sources of torque produced by the ducted fan rotor. The first is the horizontal component of the ducted fan rotor lift vector produced as the ducted fan rotor spins through the air. The second is the drag produced by the ducted fan rotor as it spins through the air. The sum of the torque produced by two the factors equals the engine torque.

The location of the vanewings below the plane of the ducted fan rotor is an improvement in the design suggested for airflow control vanes on the intake side of the ducted fan rotor, as described in U.S. Pat. No. 4,796,836. The velocity of the airflow on the downstream side of the rotor is roughly twice that of the inlet side, and thus can produce four times the lift of a similarly sized airfoil shape on the intake side of the rotor. An important part of the design of these sections is the increase in the angle of attack of the airfoil section as the ducted fan rotor mounting hub is approached. Close to the hub the zero angle of attack of the airfoil shape is more horizontal, to compensate for the greater twist of the airflow near the rotor mounting hub. More details on said vanewings are described in the section which follows entitled, VTOL Flight Regime.

The design of the vanewings and the lift distribution design of the ducted fan rotor complement each other. This is described in more detail in the section entitled, "Ducted Fan Rotor Characteristics", which follows.

Rear Section

The rear section consists of two parts, an internal part whose function is largely mechanical, and an external section whose function is largely aerodynamic and structural.

Figure 7A:
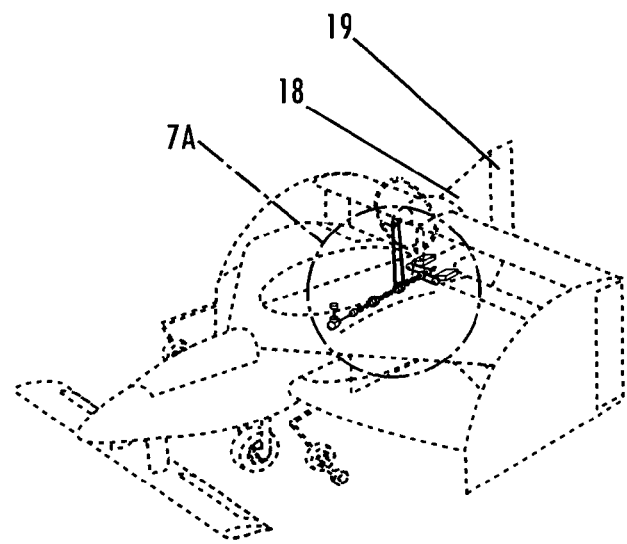
FIGS. 7A and 7B illustrate the location of the drivetrain with respect to the rest of the jyrodyne.
Figure 7B:
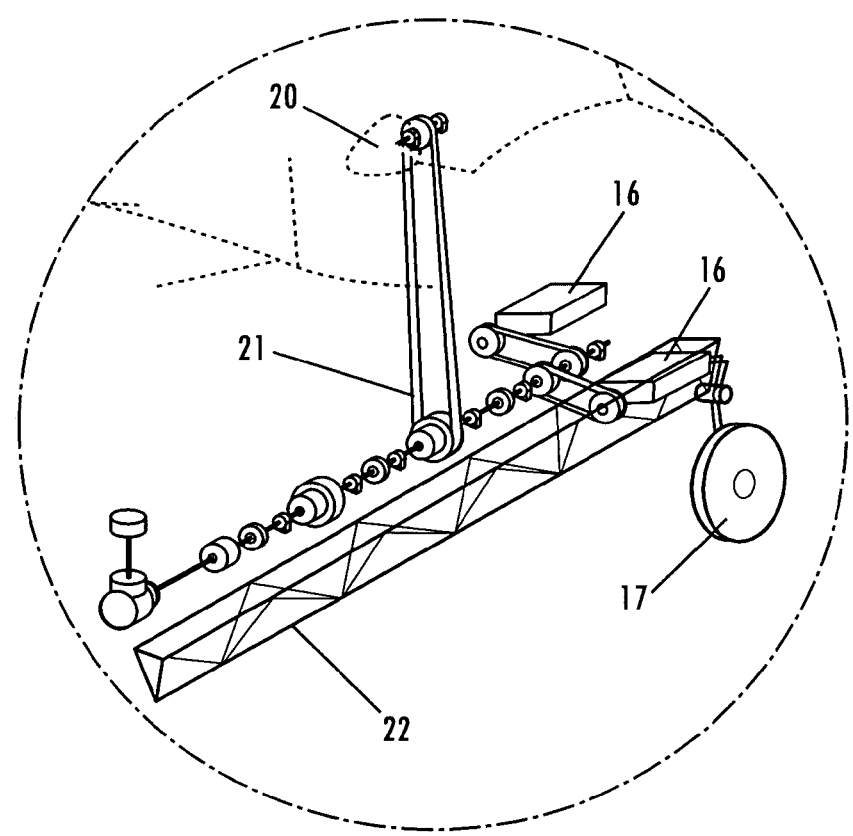
Figure 8:
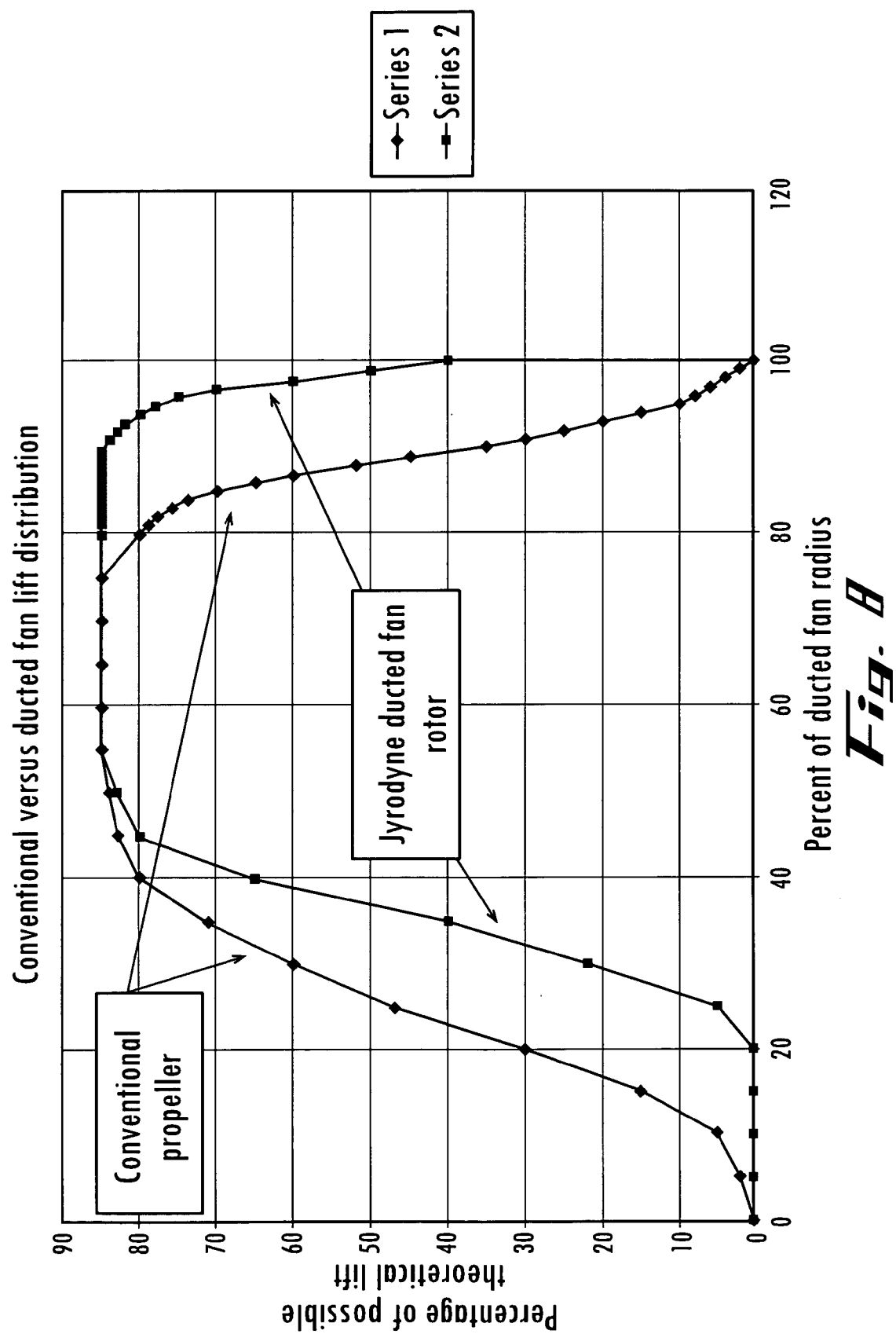
FIG. 8 is a graph which shows how the ducted fan rotor blade has a different lift profile than a conventional propeller.

Referring to FIGS. 7A and 7B, the internal part of the rear section contains the engines, 16, tailwheel, 17, and the central fin, 18, rudder, 19, the tractor or pusher prop, 20, and its associated drivetrain, 21, used for forward flight. The front of the rear section provides attachment points for the drivetrain truss, 22. The rear section of the fuselage transitions from a rounded cross section at its front to a tapered circular cross section at the rear of the rear section.

The external part of the said rear section consists of a conventional fin and rudder arrangement and structural supports for the said large "T" tail at the end of the jyrodyne.

Ducted Fan Rotor Characteristics

Referring back to FIG. 4, said ducted fan rotor, 6, is of a fixed pitch but unconventional design, with the nominal pitch to diameter ratio and chord length optimized for vertical thrust at zero vertical airspeed. In the preferred embodiment, this works out to a diameter to pitch ratio of approximately two, and a horsepower to thrust ratio of approximately 7–8 lbs. of thrust per horsepower when used with a specially designed bellmouth shroud.

In the preferred embodiment, the propeller diameter is 120" with a 6" chord, and a pitch of 56". In the preferred embodiment with two 105 hp engines, the static thrust of the ducted fan rotor is approximately 1500 pounds.

Referring to FIGS. 7A and 7B, in addition to the unusually low pitch, the lift distribution along the rotor blade is different than a regular propeller blade. The lift distribution is shifted outward along the blade and further away from the hub. This results in more of the rotor lift being produced with the airfoil at a lower angle of attack, thus causing said airfoil lift vector to realize an angle closer to the vertical. When the airfoil lift vector is divided into its horizontal and vertical components, more of the total vector goes with vertical lift, and less with producing a horizontal torque. This horizontal torque must be counteracted, and the counteracting force requires the expenditure of horsepower taken from the total available.

The total torque produced by the propeller will be the same as the engine torque, and is split into two components. One component is due to airfoil drag, while the other is due to said horizontal component of the airfoil lift vector, mentioned in the previous paragraph. Reducing the horizontal component of said airfoil lift vector allows a greater percentage of the total torque to be produced by airfoil drag, instead. For the airfoil, increased drag also results in increased lift. Reducing the horizontal component of said airfoil lift vector thus results in greater overall rotor vertical thrust. The total lifting thrust is increased. This is described in more detail in the VTOL Flight Regime section that follows. In addition to this, there is another favorable impact on vertical lift by moving the lift distribution further outward toward the periphery of the rotor. The airflow velocity further toward the periphery is increased. This increased velocity near the bellmouth increases the suction at the bellmouth and further enhances VTOL lift.

For the preferred embodiment, the angle of attack of the blade airfoil is 2° higher than the angle subtended by a pure helical track at the 56" pitch of the propeller blade. This allows the airfoil to reach a typical coefficient of lift ($C_L$) of about 0.5. This extends from 30% of the radius out to the blade tip. The use of a laminar airfoil increases the lift to drag ratio of the airfoil from the typical 20–30 of a flat bladed airfoil up to in the range of 30–40, which increases the overall vertical thrust by over 10% versus the flat bottomed airfoil.

Ducted Fan Rotor Structural Supports

Figure 9:
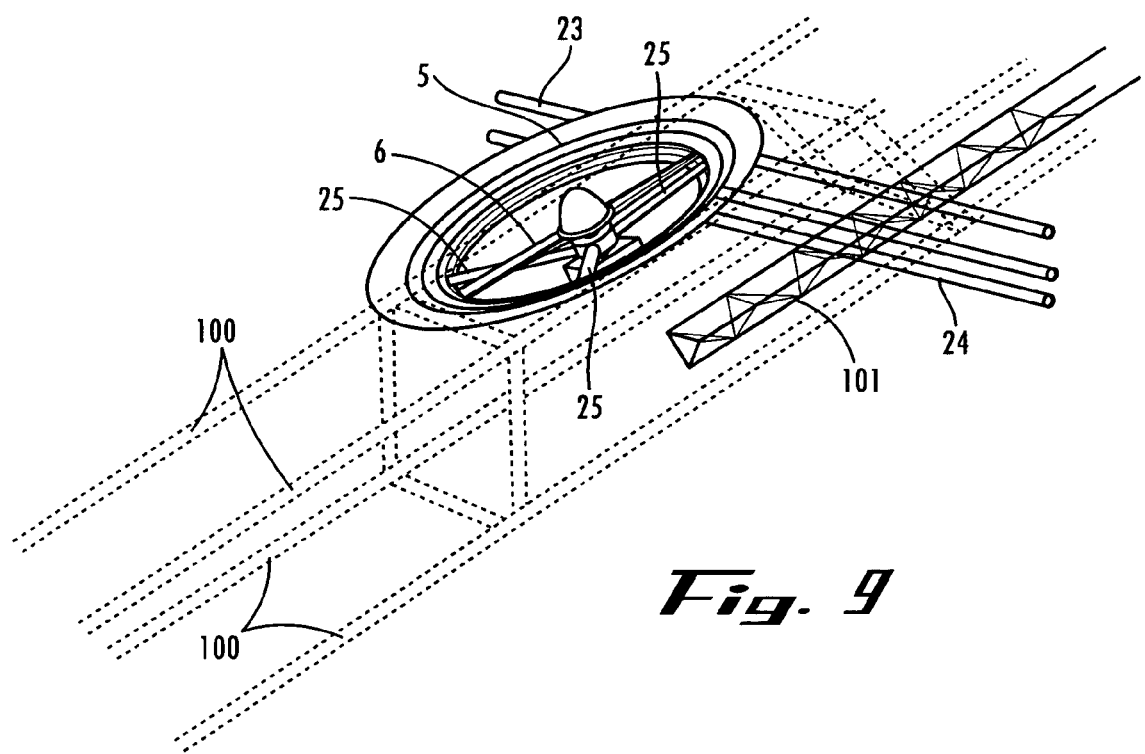
FIG. 9 shows the arrangement of the ducted fan bellmouth, the rear wing spars, and the drivetrain.

Referring to FIG. 4, the ducted fan rotor, 6, is supported from three ducted fan struts, 25, through the ducted fan shroud inlet bellmouth, 26. These supports are tied into the ducted fan shroud inlet bellmouth, 26, which also acts as a toroidal ring spar from said front fuselage section to said rear fuselage section. Referring to FIG. 9, said toroidal ring spar aspect of the ducted fan shroud inlet bellmouth causes said ducted fan shroud inlet bellmouth to be connected structurally both into said drivetrain truss, 101, and to the wing rear spars, 23 and 24 for the lop and bottom wings, respectively.

The carbon fiber ducted fan shroud bellmouth consists of two layers of 0.007" thick biaxial carbon fiber, separated by a 6" square matrix of foam ribs to provide reinforcement. Areas of attachment for said ducted fan struts and wing spars have additional layers.

Special Shroud Characteristics and the Shape of the Central Duct Hole

The most striking characteristic of the ducted fan shroud is that its inside diameter is larger than the diameter of the fuselage at said middle section of said jyrodyne.

The ducted fan inlet shroud bellmouth is designed to improve the lifting characteristics of the horizontal ducted fan rotor. Referring to FIGS. 10A-10D, a cross section of the ducted fan inlet shroud bellmouth indicates an airfoil-shaped cross section capable of producing lift. This design provides significantly higher overall lift than a simple unshrouded propeller does for the same diameter and pitch for the same horsepower input. The point of closest approach of the rotor, 6, is shown. It is similar to the designs of shrouds made by Dr. August Raspet for the series of aircraft he made while at the University of Mississippi, such as the Marvel II.

Figure 11:
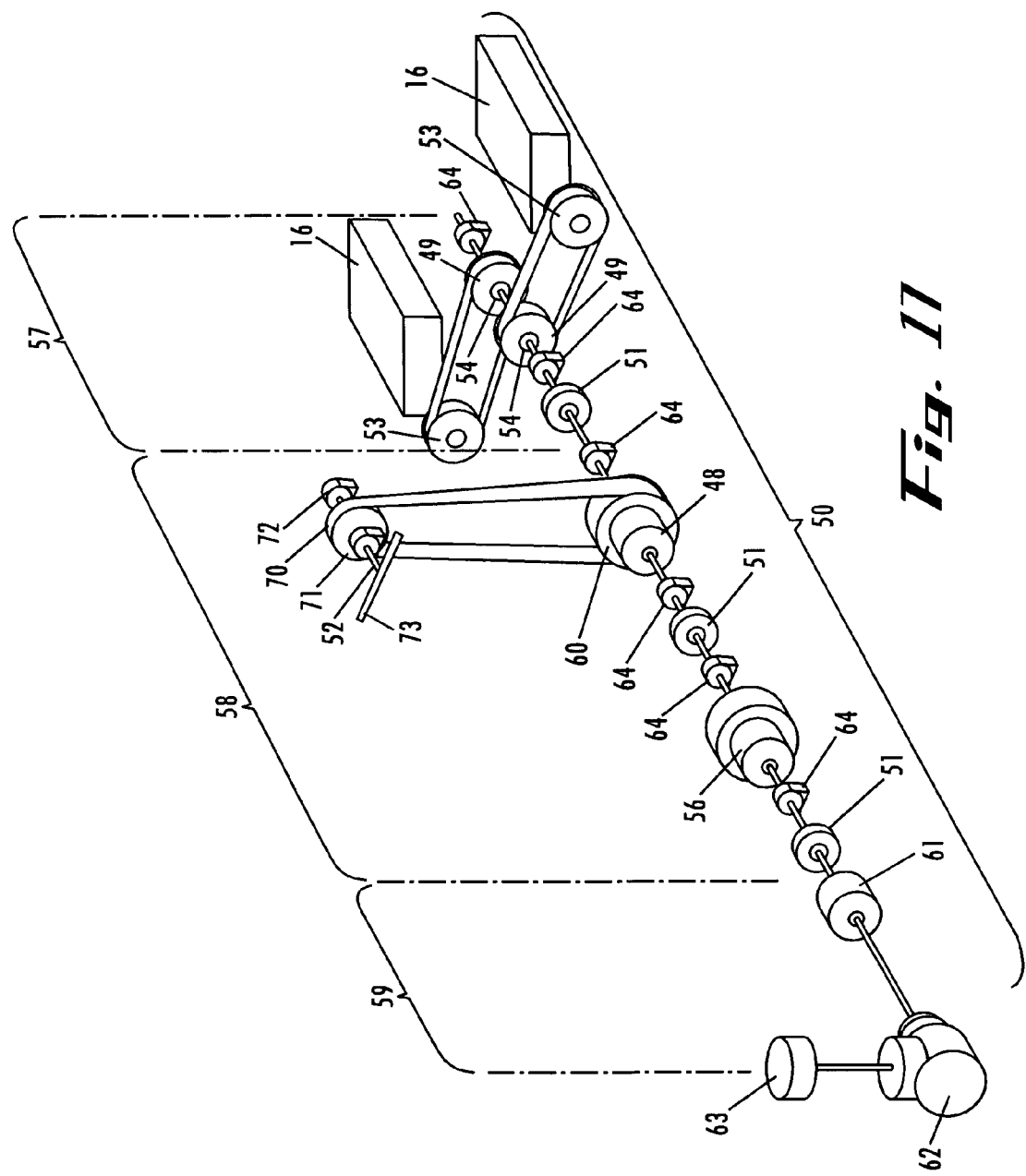
FIGS. 11A-11C show how the top wing spar for the top wing interacts with the bellmouth of the ducted fan shroud.

Referring to FIGS. 11A-11C, the ducted fan shroud further serves as a spar carry through for the front spar of the top biplane sing, 26. Said shroud is as thick as the top wing, and provides a smooth transition from the right top wing to the left top wing.

The ducted fan shroud provides a nominal diameter to height ratio of 0.65 from the top of the shroud to the bottom of the jyrodyne fuselage.

The radius of said shroud bellmouth is not larger at the front side of the shroud, 27, compared with the rear side of the shroud, 28. For a constant horsepower applied to the lifting rotor the design of said shroud inlet bellmouth has a major influence on the vertical thrust produced, and is optimized for a zero forward airspeed. Said bellmouth is parabolically convergent, to provide the smoothest acceleration of the inlet airflow to maximum velocity. It also provides a nominal radius of curvature greater than 0.2 times the overall ducted fan shroud diameter, to minimize entrance losses, which can be considerable.

The most important design feature of the ducted fan inlet shroud is its location in the top surface of the top wing. There is additional lift enhancement possible for the ducted fan by extending the horizontal lip of the inlet bellmouth out to a greater distance from the rotor axis than the top edge of the bellmouth. The velocity and pressure profile of the entering airflow extends out well beyond the edge of even the large radius bellmouth used in the jyrodyne ducted fan inlet shroud.

The action of the ducted fan rotor when in operation creates a low pressure "bubble" around the entire shroud inlet, which extends out past the edges of the shroud inlet bellmouth and over an adjacent area of the top wing. This reduced pressure acts on the top wing and increases lift. This increased lift was measured over the wing of the Ryan VTOL aircraft, and was found to be an increase in 50% over the conventional lifting capability of the same wing during regular transitional flight at the same airspeed.

Shroud Cross-Section Geometry—Inlet Side

A cross section of said inlet shroud does not vary around its perimeter. Since the jyrodyne will be lifting vertically and then moving forward to attain lift from the wings by conventional means, the radius of the forward section of the shroud does not need to be larger than on the sides of the shroud. The rearmost section of the shroud does not have a smaller radius for the same reason.

At the design transition airspeed of 10–30 mph, the vector of the air entering said ducted fan rotor will no longer be perpendicular to the plane of the rotor. At the leading edge of said ducted fan shroud inlet bellmouth, the vector will lean backward approximately 25° from the vertical as it passes through said rotor. At the trailing edge of said bellmouth, the airflow will still move forward against the initial forward flight of the jyrodyne even at forward speeds of 10–15 mph as it enters the rotor plane, resulting in the air at the rear of the inlet to said bellmouth gradually reversing direction as the jyrodyne accelerates from a hover to forward flight. This has a major effect on the location of said jyrodyne center of lift while in the transition range of 10–30 mph. Aerodynamic devices to control this effect are described in more detail in the section entitled, "VTOL Flight Regime".

While these are important considerations for smoothing the entering airflow at transition speed, the design objective of said ducted fan shroud inlet bellmouth of the jyrodyne is to achieve maximum thrust at zero airspeed. A loss in vertical thrust once forward speed has been attained is not particularly important on said shroud inlet design, since additional lift from the wings begins to have an effect once forward translation begins. This is not true for the outlet side of the shroud.

Shroud Cross-section Geometry—Outlet Side

The outlet of the ducted fan shroud exbedded in the top wing has a different design consideration than the inlet. Referring to FIGS. 11A-11C, a side view of the entire inlet shroud will show an inside profile that resembles the top of a thick airfoil. The bottom end of the shroud is similar to the bottom of an airfoil, and is slightly divergent to provide smooth acceleration of the air outside the shroud. The exiting airmass is accelerated by tapering the rear edges of the shroud outwardly by 7°.

This cone of exiting high velocity air ejected downward by the ducted fan rotor, called "the thrust cone", is affected by the forward translational speed just like the inlet air is. In this case, the outlet speed is approximately 80 mph, so at a transition speed of 20 mph, said thrust cone tilts backward at an angle of approximately 14°. In order to accommodate this, the rear part of said circular hole for the ducted fan exhaust in said bottom wing, is extended rearward at an angle of 22°, to consider said thrust cone tilt and the normal divergence in the thrust cone.

Ducted Fan Inlet Shroud Bellmouth Ring Spar

In addition to providing a smooth acceleration of the entering air, the shroud performs several structural functions, some of which have already been described in the earlier section entitled "Ducted Fan Rotor Structural Supports". The ducted fan shroud also helps to support the bottom wing, in addition to the top wing as described earlier. The front of the inlet shroud helps transfer some of the wing bending load on the bottom wing through the fuselage in a manner similar to a ring spar encircling a passenger cabin. The load is transferred from the front wing spar of the bottom wing, up through a midrigger to the front part of the ducted fan inlet shroud, as is shown in FIGS. 11A-11C. It then is transferred across the shroud to the other wing, where it follows a similar path and function.

For the top wing, its front spar passes inside the front part of the ducted fan inlet shroud.

Personnel Safety Aspects of Catastrophic Failure of the Rotor

Referring to FIG. 12, one unusual characteristic is that the plane of the ducted fan rotor in the exbedded ducted fan lies completely above the top of the passenger portion of the front section of the fuselage. Thus in the event a rotor blade separates from the hub due to some catastrophic event; its route of flight will not result in contact with either the pilot or passenger. To enhance this inherent protection, those sections of the shroud lining which are along the direct path for a rotor path toward the passenger compartment are strengthened to direct any rotor blade parts further upward away from the passenger compartment.

Midrigger

Figure 13A:
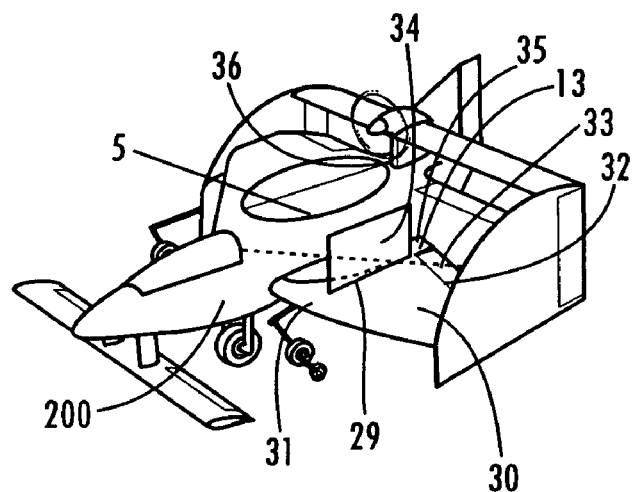
FIGS. 13A and 13B illustrate the location of, and details, concerning the rear part of the bottom wing.
Figure 13B:
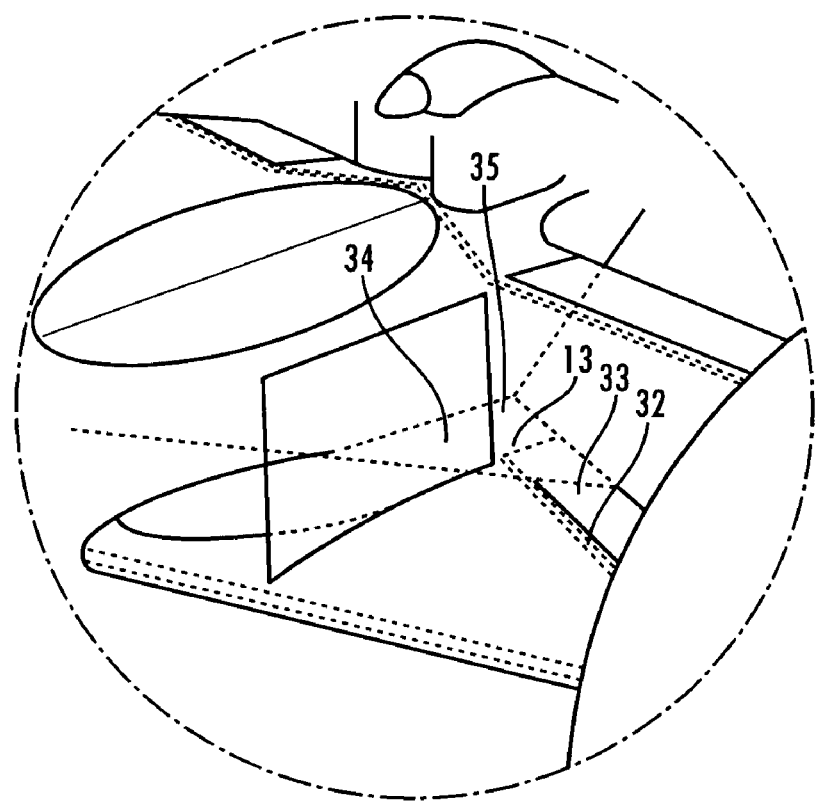

Referring to FIGS. 13A and 13B, midriggers, 29, are defined as the additional vertical wing support panel structures outboard of the main fuselage, mounted at the edges of the exbedded ducted fan. Said midriggers assist the structural interaction of the main fuselage, the ducted fan shroud and the biplane wings, to further reduce the weight of both the wings and the fuselage. These vertical wing support panel structures are called the midriggers and are similar to conventional biplane N-struts, but are covered with fabric. Since the jyrodyne has a large hole in its center, a significant stress riser must be compensated for. These midriggers, 29, help tie together the top surface of the exbedded ducted fan inlet shroud bellmouth, 5, the bottom and top wings, and the bottom of the fuselage of the jyrodyne where the wings and fuselage meet.

The midriggers lie in parallel to the fuselage and airflow, and are placed longitudinally tangent to the outer radius of the exbedded ducted fan inlet shroud where it is furthest from the fuselage on both sides of the jyrodyne. They are canted 7°, with the top edge inboard of the bottom edge to match the divergent thrust cone angle.

Bottom Wing Support

Again referring to FIGS. 13A and 13B, said midrigger, 29, extends upwards and backwards from the front of said bottom wing up to said ducted fan inlet shroud bellmouth, 5, and also to the front edge of said top wing as a solid panel.

Said midrigger, 29, thus is a vertical solid panel which also extends back along the top of said bottom wing, and then continues rearward, going beyond the rear end of said bottom wing.

Rear Wing Support

Said midrigger extends from the front spar of the bottom wing to the front spar of the upper wing.

Wing Arrangement for Conventional Flight Regime

Biplane Configuration Preferred

There are five primary reasons for selecting the biplane configuration. They are:
1) The first is the reduction in the jyrodyne overall wingspan while maintaining a total wing lifting area. This reduces hangar requirements to that of conventionally sized "T" hangars, while maintaining low stall speeds.
2) To get the sequential stall characteristics of a staggered biplane arrangement, to make the jyrodyne stall characteristics milder.
3) To offer the reduction in overall wing weight that comes from the truss-type construction available with biplane wings. An optimally designed biplane arrangement can be reduced in weight to 60% that of a monoplane arrangement with the same strength, due to the wings acting as a deep truss.
4) Two sets of fuel tanks at different moment arms from the center of gravity allow movement of fuel to adjust the center of gravity for VTOL takeoffs.
5) The high drag characteristics of biplane wings help reduce excessive airspeed buildup in high angle of descent approaches to landing.

Monoplane Configuration Possible

While the biplane configuration is the preferred embodiment, a jyrodyne with a monoplane wing is a possible alternate configuration. In this configuration, just the top wing is utilized with the exbedded ducted fan mounted in an enclosed manner inside the top wing. In this embodiment, the roll and yaw vanewings are mounted externally on struts on the lower exterior of the fuselage. The outrigger landing gear is mounted to the bottom of the top wing at mid span.

Airfoil and Wing Selection

The airfoil and wing design for the jyrodyne follow conventional practice for tandem wing pitch control, stall resistance and a straight ahead stall break, by providing 3° of twist to the bottom wing, and 1° of twist to the top wing. Decalage provides 3° higher angle of attack for the bottom wing than the top wing, with 5° of dihedral in the bottom wing, and none in the top wing. The top wing root is at a 3° angle of attack with respect to the fuselage, while the bottom wing root is at a 4.5° angle of attack.

However, the location of flaps on the bottom wing, and flaps and ailerons on the top wing, have two specific purposes which are unique to the special aerodynamic considerations of low altitude, slow speed VTOL/STOL approaches to landing, and for ferry flight takeoffs. There are two novel reasons for this particular configuration of the flaps and ailerons, which are related to the unique design of the jyrodyne's ducted fan. The purpose of these devices involves two aspects of landing approaches:
1) extra compensation for the ducted fan forward lift movement during its activation:
2) progressive but gentle stall characteristics which have more stall control authority than conventional approaches to the stall;

Flap deployment generally causes two changes to the lift characteristic of a wing;
1) it increases the lift coefficient at a given angle of attack;
2) it reduces the angle of attack where a stall occurs.

During an approach to landing, the jyrodyne will have its flaps deployed, which will increase the bottom wing lift, allowing a desirable slower approach. When the ducted fan is engage and begins to produce its standard pitch-up characteristic, the immediate increase in the angle of attack of the jyrodyne will stall the bottom wing, which will neutralize the pitch up tendency caused by activation of the ducted fan. However, since the top wing has the ailerons outboard and is at a lower angle of attack than the bottom wing, the ailerons will remain effective during the stall of the bottom wing, and the jyrodyne will not have a tendency to roll during the stall.

Since the stalls that do occur will be at very low altitudes and at low airspeeds, a "mushing" type of stall is much preferred to a sharp break downward, or down and to the left or right. The use of two wings, separated by a short lateral distance, facilitates this "soft" stall characteristic much better than a single wing.

The use of biplane wings in a VTOL aircraft is a unique and novel aspect of the jyrodyne.

Pitch Stability and Center of Gravity Weight Shift

The negative stagger arrangement of the jyrodyne biplane wings provides the maximum possible pitch stability during stalled conditions. The bottom wing is set at a slightly higher angle of attack than the top wing during cruise flight. As the jyrodyne slows down to the stall, the downwash from the bottom wing further acts to slightly reduces the angle of attack of tie top wing, contributing to the increased angle of attack of the bottom wing relative to the top wing causing the bottom wing to stall first This causes a pitch downward, allowing easy and conventional stall recovery. Since the ailerons are on the unstalled top wing, roll control using ailerons remains available throughout the stall.

The negative stagger arrangement is also favored by the location of the flaps on the bottom wing. Flap deployment reduces the stall angle of attack of most airfoils. Thus, in an approach with flaps, the bottom wing will tend to stall at a lower angle of attack that it will without flaps. Since it is forward of the center of gravity, it will tend to cause a downward pitch of the jyrodyne nose, which is the preferred action on stalling.

Canard

The canard is located in the forward half of said front fuselage section and is mounted below the fuselage. The canard is a high-aspect ratio rectangular wing with a shorter chord than the bottom wing. The canard has a more highly cambered airfoil than the bottom wing, so that it has the characteristic of a lower zero lift angle of attack curve which is necessary for tandem wing pitch stability at the stall. The canard itself has a fixed angle of attack. The combination of the canard and the biplane configuration provide exceptional secondary deep stall characteristics; the canard stalls first to lower the nose of the aircraft, and then in sequence, the bottom wing will stall second if flight conditions in pitch are severe enough to warrant a secondary stall.

A less important design parameter for the canard is to provide a convenient location for the movement of fuel for weight and balance purposes. Many light helicopters require the movement of a lead weight when going from a one passenger to two passenger carrying configuration. This is a greater problem with a jyrodyne because of the larger moment arm for the passengers who are located well forward of the jyrodyne center of lift. While compensated for by the location of the engines, there is a significant center of gravity shift between the one and two passenger VTOL flying configurations.

The canard provides a convenient storage location for enough fuel to compensate for the weight change when going from a two passenger configuration to a single passenger configuration. Fuel can be simply added at the stop where the other passenger is dropped off. This can be an external fuel addition, or a transfer of fuel from one of the main wing tanks. For the case where a passenger is added at a stop, the fuel in the canard can be transferred from the canard tank to the any of the four main wing tanks.

Figure 23:
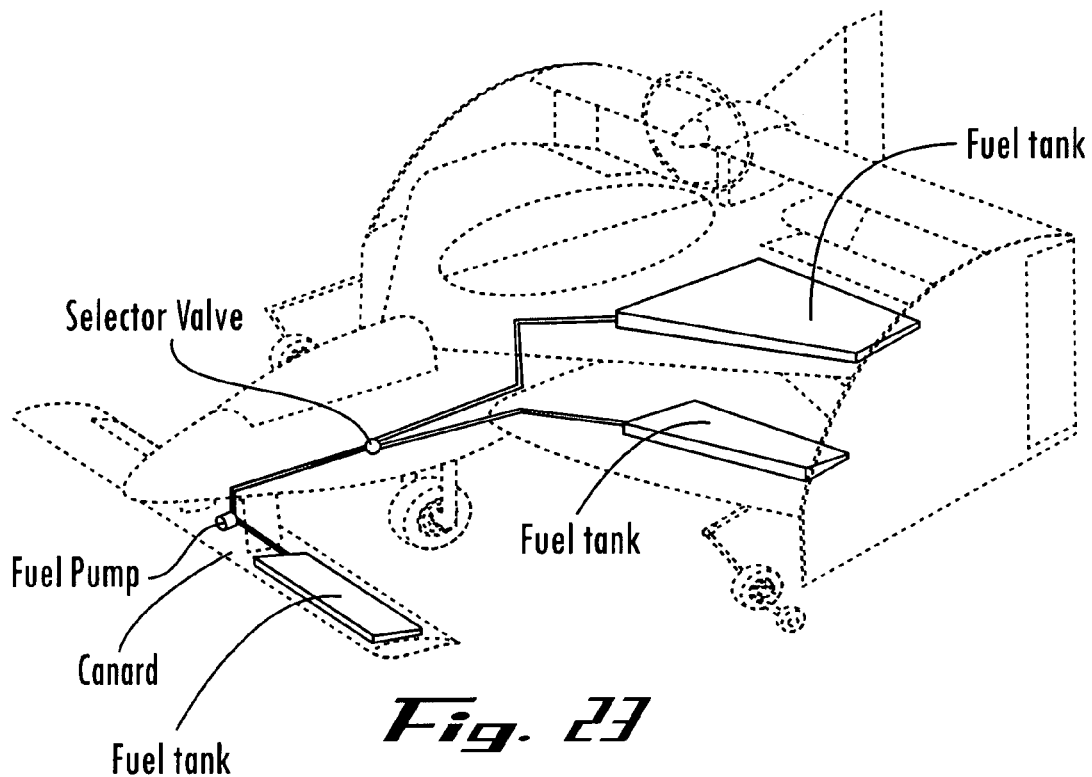
FIG. 23 illustrates the arrangement of the fuel tank locations and transfer lines in the jyrodyne

This is best seen by referring to FIG. 23, which illustrates the fuel tanks, the fuel pump and fuel lines.

Transfer of fuel from the tanks to the engines is performed in the conventional manner and is not shown.

Bottom Wing

Referring to FIGS. 13A and 13B, the attachment of said bottom wing, 30, to the fuselage occurs at the bottom of the fuselage. 200. Said bottom wing contains two main spars, 31, 32, as in the conventional manner, a front spar at the 5% chord point and a rear spar at the hinge point for the flaps. Said bottom wing contains flaps whose chord is 25% of the average chord of the wing. The flaps are illustrated at 33, which extend for 70% of the wingspan. These flaps may also to provide additional capability for forward/rearward travel of said jyrodyne center of lift, due to the large center of gravity shift experienced by the jyrodyne with payload changes in the front compartment. Thus, at heavy payload weights in the passenger compartment, the flaps may be deployed to assist in shifting the jyrodyne center of lift during conventional takeoffs.

The front spar of said bottom wing completely clears the bottom wing circular cutout made for the thrust cone of said exbedded ducted fan mounted at the center of the jyrodyne top wing, while the rear wing spar of said bottom wing is angled to avoid passing into the area of said bottom wing cutout, as shown at 13. The rear spar of said bottom wing is uncovered, and inboard of the midrigger there is no lifting surface for the rear section of said bottom wing. The rear spar of said bottom wing is thus exposed to the outside air from the midrigger position to its attachment at the rear fuselage. This is to prevent downwash from said exbedded ducted fan impinging on the rear inboard surface of said bottom wing. This is explained in more detail in the following paragraph.

The rearward movement of the thrust cone during transition flight would normally pass onto the surface of the rear part of the bottom wing. With the thrust cone velocity downward at about 80 mph, and the forward translation flight at 20 mph, the angle of the thrust cone will be rearward at about a 21° angle. Impact of the inclined thrust cone onto a horizontal lifting surface at this location would cause a substantial downthrust, and at this location would result in a substantial upward pitching motion occurring with a simultaneous loss in lift. For this reason, the rear parts of the bottom wing that would be affected by this have been eliminated. All that is left is the rear spar, 35, for the bottom wing that is required for structural reasons.

Top Wing

The top wing main spar at the 25% chord point for the top wing intersects and connects to said ducted fan inlet shroud bellmouth toroidal ring spar. The top wing rear spar, 36, passes behind the rear edge of the ducted fan inlet shroud bellmouth. The top wing rear spar is placed at the hinge point for the ailerons, and provides attachments for the ailerons. Ailerons constitute 100% of the wingspan. Ailerons may be drooped at low approach airspeeds.

Sizing Criteria for Horizontal Stabilizers

For the preferred embodiment, the criterion for the jyrodyne horizontal stabilizer area is at least 37% of the biplane wing area. This is well above the upper range of typical stabilizer volume (defined as the moment arm from the center of lift times the horizontal stabilizer area) and area requirements for conventional aircraft. This higher area requirement is due to the payload variation occurring under normal conditions that is some distance from the aerodynamic center, in the front fuselage section of said jyrodyne in front of the ducted fan and biplane wings. The jyrodyne stabilizer volume and area is also higher because the tailplane moment arm is short in comparison with the average wing chord. Typical aircraft have a tailplane moment arm/mean aerodynamic chord (MAC) ratios of 3.5 to 5. For the jyrodyne, it is 2.1. Thus almost twice as much area is required in the jyrodyne to provide pitch and yaw stability, just to maintain the same tail volume relationship as conventional aircraft.

There is also a significant center of lift adjustment for the top wing in the area immediately forward of the ducted fan which must be compensated for, which occurs during the transition from vertical to horizontal flight. This special phenomenon pertinent to VTOL aircraft like the jyrodyne, "extra front quadrant lift", has been discussed earlier. This is an additional aerodynamic load above that required just to adjust for the shorter tailplane moment arm/mean aerodynamic chord (MAC) ratio. The moment arm distance from the jyrodyne center of gravity to the payload center of gravity for the jyrodyne is also very high in comparison with conventional aircraft designs, requiring the use of a higher than normal pitch-activating torque from the stabilizer to compensate. For this reason, the area required for the jyrodyne for its horizontal tailplane is 37% of the area of the main wing. For conventional aircraft, the area typically is about 20%, with jets using even smaller areas. It should be noted that many of the patents which have issued in the past which use ducted fans for VTOL flight do not adequately address this issue.

Airfoil Selection Criteria for the Stabilizer

The airfoil selected for the stabilizer has a fixed leading edge slat like the Zenith Aircraft Model 701, which has a very high angle of attack at the stall, and has a wide range of angle at the stall where the lift coefficient remains relatively constant. This is to ensure that the stabilizer stalls last in any mode of flight. The stabilizer also provides 3° of dihedral.

Leading Edge Slot for Stabilizer

It is possible in aft loading conditions at very light loads, for the loading on the bottom wing to be so light that both the bottom and top wings will approach stall at the same angle of attack. This will occur only if the front wing flaps are in the extreme upward reflex position. For this reason, the addition of a leading edge slot for the stabilizer increases the stall angle of the stabilizer to well above the stall angle for the two biplane wings. This thus prevents a tail first or hammerhead-type stall for the jyrodyne, since even if the two forward wings stall together, the rear stabilizer, which is unusually large, will remain unstalled.

Sizing Criteria for Elevator

For the same reason, as for the sizing criteria for the horizontal stabilizer, the design pitching torque for the elevator needs to be much larger than normal. This allows the ability to offset the potentially high moment arms from payload changes in the passenger compartment. Also, with a relatively short moment arm the size of the elevator needs to be larger than normal.

For this reason, in the preferred embodiment the percentage of the horizontal stabilizer area required for the elevator is 35% with a range of 25–50% of the area of the horizontal stabilizer providing satisfactory aerodynamic control.

Sizing Criteria for the Canard

While the canard provides additional aerodynamic control of pitch, its secondary function is to provide a forward exterior location for fuel used for weight and balance purposes. It must have an aspect ratio higher than the two biplane wings, in order to facilitate its stall prior to the stall of either of the two biplane wings. It must be able to carry 15 gallons of fuel per side, and be able to lift a maximum of 500 pounds at a full gross weight conventional takeoff speed. This drives the area requirement of 50 square feet of surface area for both sides of the canard at a 10 pounds/square foot loading. The canard has a chord of 3'–6" and a semispan of 8' per side.

Split Elevator Arrangement

Figure 14:
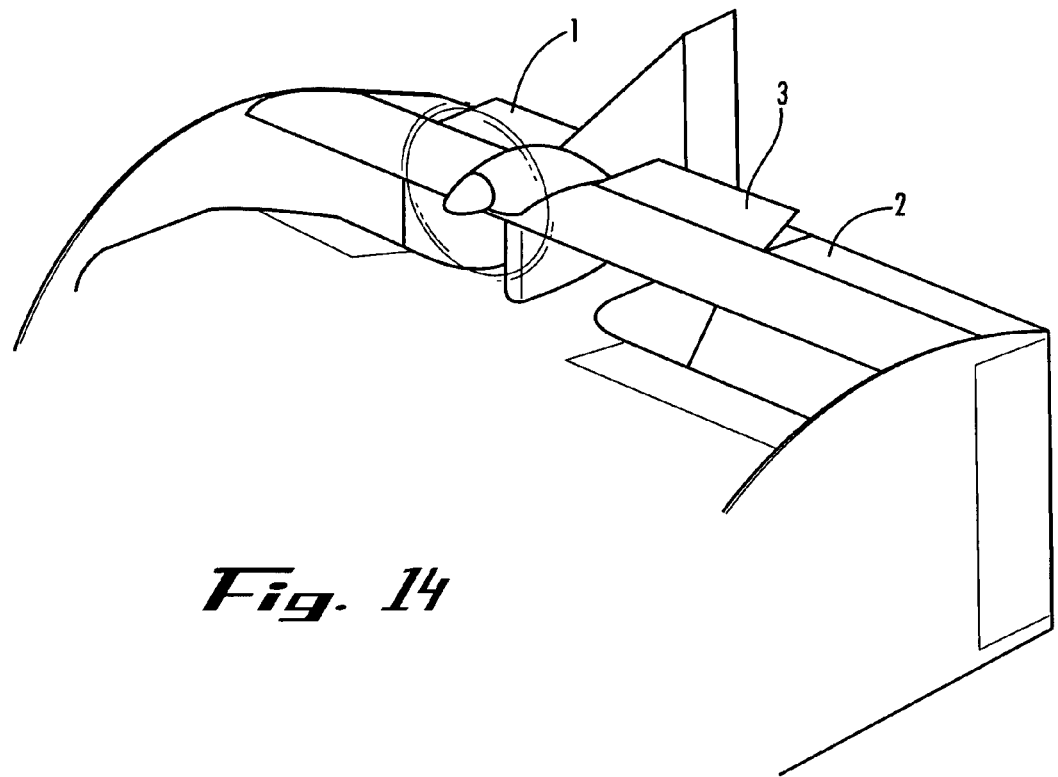
FIG. 14 illustrates the different action of the central third of the elevator than the two outer sections.

The central third of the elevator located on the horizontal stabilizer of the "T" tail which lies in the slipstream of the tractor or pusher propeller, operates separately from the two outboard sections, as may be seen in FIG. 14. The central section is denoted by 3, and the two outboard sections as 1 and 2. This is due to the need to compensate for changes in the thrust moment arm of said tractor or pusher propeller when the engine throttle position is changed. For instance, without this feature, quick closing of the throttle at the end of a takeoff run reduces the forward thrust of said tractor or pusher propeller. Since said forward thrust acts through a long moment arm whose thrust vector is above the jyrodyne center of gravity during full throttle takeoffs, said forward thrust of the high-mounted tractor or pusher propeller tends to press the nosegear of the jyrodyne on the ground. When the throttle is suddenly closed, the moment arm effect pressing the nosegear down is reduced to the point that the jyrodyne will pitch up at just below takeoff speed, lift into the air and stall. This happened several times to radio-controlled models of the jyrodyne, resulting in minor damage to the models in subsequent hard landings. By linking the central third of the elevator to the throttle, the elevator can respond instantly to changes in throttle position and prevent the stall. The prop wash from the prop enhances the effectiveness of this central third of the elevator.

The split elevator arrangement is particularly important during an aborted landing, when the throttle is advanced rapidly to initiate a precautionary takeoff, called a "go-around". Without this feature, the initial pitch down by the increased throttle could be sufficient to cause the jyrodyne to impact the runway inadvertently.

Sizing Criteria for Vertical Fins

The jyrodyne has three large vertical fins, similar in function to the Lockheed Constellation. One is in the center, and two are at the wingtips. The two fins at the wingtips have been defined earlier as sidefins.

In the preferred embodiment, yaw stability requirements for the jyrodyne have been found during taxi and low speed flight testing to be substantially higher than for a conventional aircraft, since the rearward location of the tractor or pusher propeller produces thrust much further aft than in a conventional aircraft. The vertical tail plane area as a percentage of the wing area requirement for the jyrodyne is 40%, roughly 3 times larger than the tailplane area requirement for conventional aircraft. Furthermore, the jyrodyne operates at much slower speeds than conventional aircraft, and thus requires larger control surfaces to compensate for the lower dynamic energy of the air passing over the surfaces. Another sizing criterion for the jyrodyne is to fit into a conventional 40 foot wide "T" hangar as is seen at most airports. Thus, the jyrodyne overall wingspan is limited to less than 40 feet, and length and height are limited to values of 32' and 13', respectively. The location of the exbedded ducted fan limits the overall length to a short rear fuselage, and to get the necessary tail volume for the aircraft the vertical fins need to be large. For these reasons, the size of the vertical fins for the jyrodyne are substantially larger than such other similar twin finned aircraft such as the Lockheed P-38, Cessna Skymaster or Rutan Long-Ez, whose tailplane/wing area ratio requirements are around 13–15%.

Drooped Tips on Fins

Crosswind testing with radio-controlled models of the jyrodyne indicated that said sidefins created an upsetting moment since their center of pressure in a crosswind is well above the center of gravity of the jyrodyne. Referring to FIG. 15, to compensate for this, downward-drooped tips at the bottom of the sidefins, 37, were added to move the center of pressure downward. This addition, which is part of the preferred embodiment, neutralized the effect of crosswinds in creating an overturning moment.

"S" curvature on sidefin top edge

In the same manner, it is preferable for the jyrodyne at the end of a takeoff roll just prior to liftoff to lean into a crosswind, since upon liftoff it will need to turn into the wind to maintain a heading straight down the runway. Again referring to FIG. 15, this is accomplished in the preferred embodiment by making an "S" shaped cutout, 38, in the top edge of said sidefins just aft of the top biplane wing. This "S"-shaped cutout further lowers the center of pressure of a crosswind, and results in a center of pressure at or below the center of gravity of the jyrodyne. When a crosswind hits the jyrodyne, it tends to lean slightly into the crosswind, rather than be blown over away from the crosswind.

Prior to these two modifications to said sidefins, the jyrodyne would have a tendency to flip in cartwheels in strong crosswinds, due to the downwind landing gear outrigger digging into the ground, while the upwind sidefin would lift up and cause the radio-controlled model to overturn.

Sizing Criteria for Rudders

The rudder area requirement for the jyrodyne is not substantially larger than that of the conventional aircraft mentioned above. The rudder percentage of the total fin (vertical stabilizer) area determined to be unsatisfactory during radio control model crosswind testing was 17%. However, this amount of rudder was sufficient for control for most conditions, including normal takeoffs and landings. Normal values for aircraft are in the 30–40% range. The rudder area also needs to be larger than normal to compensate for crosswind control problems caused by the enhanced fin area required for low speed flight. Thus in the preferred embodiment the rudder % of fin area is 40%. It should be noted that due to the large area of the vertical center fin and sidefins, the total area of the rudders is much larger than conventional aircraft of the same fuselage volume.

VTOL Flight Regime

Mid Section Anti-torque Airfoils

A significant fraction of the total horsepower used is converted by the ducted fan rotor into a torque effect which acts opposite to the rotation of the rotor. This torque is equivalent to the torque produced by the engine, multiplied by the typical overall gear ratio reduction of 4/1, and represents roughly 900 foot pounds of torque in the preferred embodiment. This is caused by two reasons:

1) the horizontal force vector produced by the rotor aerodynamic lift vector not being perfectly vertical, and
2) the horizontal component of the drag vector produced by the rotor airfoil.

As discussed earlier, the vertical sides of the center fuselage section that are inside the ducted fan shroud consist of high-lift, undercambered airfoil sections. These were defined previously as vanewings. Referring to FIG. 4, there are from three to four of these vanewings 8, up to two on each side. The front two vanewings produce lift in opposition to the rotor torque. The rear one or two sections are reversed in position from the front two sections, to provide a similar thrust in a reverse direction to the rotor torque. All four sections have a hinged section at the bottom, 14, similar to ailerons, which is used to assist in a trim function for yaw caused by the rotor torque.

The airfoils are placed at a slight positive angle of attack with respect to the rotating airstream. This along with the high camber of the airfoils produces a lift vector that is oriented slightly upward. Thus, the anti-torque airfoils also produce a significant amount of vertical lift while compensating for the torque of the rotor.

Imbedded and Canted Pitch Control Vanes

Referring to FIG. 16, pitch control while in the VTOL mode is maintained from two long symmetrical airfoil-shaped shaped vanes. 40, mounted vertically inside the center fuselage, in the thrust cone of airflow from the horizontal ducted fan rotor. One is located forward of the ducted fan driveshaft, the other to the rear. At low pitch correction requirements, the vanes act to smoothly redirect the airflow through the duct, creating a slight pitching effect and simultaneous small thrust; at high pitch requirements the airfoils stall and thus interrupt the airflow through the duct to create a much more forceful overturning moment. The front vanes are canted backward 3–5°, while the rear vanes are canted forward 3–5°. This creates a dihedral-type of effect that stabilizes the hovering characteristics of the jyrodyne.

In order to minimize the control forces activating the control vanes, and to ensure that the vanes will not lock up in a closed position which would cause an jyrodyne tumble, the axis of rotation of the vanes is at the 25% point of the mean aerodynamic chord (MAC) of the airfoil shape in the preferred embodiment. For the high pitch correction requirement, only one vane of the two vanes moves at a time to a stalled angle of attack.

Exbedded Airpath Roll/Yaw Control Vanes

Four other vanes, similar in size but different in airfoil shape to the pitch control vanes are mounted between the center fuselage and the midrigger struts. These vanes are mounted in the airflow path of the ducted fan rotor, but outside the fuselage. They are thus called exbedded airpath roll/yaw control vanes. Said vanes, 41, are oriented parallel to the fuselage, to present the minimum area to the airflow passing over them from front to rear while the jyrodyne is flying forward in conventional flight mode.

These four vanes operate together to effect roll control, and separately to effect yaw control.

For roll, the two vanes on each side of the jyrodyne pivot together. In the VTOL mode, they cause the jyrodyne to move laterally to the left or right.

For yaw, they pivot opposite to each other. To turn clockwise, the front two vanes rotate the top of the vane to the right looking at the jyrodyne from the top, with the front of the jyrodyne at the 12 o'clock position. The rear two vanes rotate the top of the vane to the left. In the radio-controlled model of the preferred embodiment, single servos were used to mix the roll and yaw functions using a computer radio control transmitter to achieve the desired effect.

The axles which support said vanes are mounted into the front of the bottom wing and are attached to the rear wing spar extension of the bottom wing. In conventional flight these vanes may be pivoted 900 to a horizontal position to reduce drag.

Hover Stability and Control Setup Requirements

Hover stability is enhanced by canting the pitch and roll/yaw vanes so that they direct the downward thrust from the rotor slightly outward from the center duct. The Harrier VTOL fighter aircraft performs a similar action to enhance hovering stability, by directing the thrust from its engines slightly outward at about 5° from a vertical direction. The thrust vector thus has both a horizontal and vertical component. In the preferred embodiment, when the ducted fan is tilted so that it no longer pointed directly perpendicular to the ground, the thrust vectors from the canted control vanes help to force the ducted fan back to a perpendicular direction. This stabilizes the hover.

In the preferred embodiment the angle of thrust deflection is set at 3–5° outward from the centerline of the jyrodyne from the vertical.

In a similar fashion, when the ducted fan is tilted, part of the vertical thrust holding the jyrodyne aloft is converted into a horizontal component that now no longer supports the jyrodyne above the ground. With less lift, the jyrodyne would begin to settle to the ground. To compensate for this, a small amount of additional throttle is automatically added when the controls call for more pitch or yaw control. The pitch and roll/yaw controls for the radio-controlled version of the jyrodyne provided for a 7% mixture with the throttle, over the full 100% range of the throttle. With the activation of the pitch and roll/yaw controls, a throttle increase occurs automatically, to compensate for the lift thrust transferred to forward thrust In the preferred embodiment for instance, a 50% move in the stick for the yaw controls yields a 3.5% increase in the throttle position. This resulted in the attainment of a much more stable hover, eliminating the need for pilot corrections to throttle, and reducing altitude variance.

In the preferred embodiment, there is a 7% mix of throttle position with pitch, yaw and roll positions of the control vanes. Depending on the size and type of jyrodyne, the range of mixture requirement can be from 3 to 15% of the full throttle movement. The lower value would apply to large, inherently stable transport type jyrodyne, while the higher value would apply to more nimble, scout or reconnaissance jyrodyne.

Midrigger Dorsal Fin Extensions

The Marine Harrier VTOL aircraft mounts longitudinal flat plates on the underside of the wings when armaments are not mounted at that position. This is to recapture extra vertical lift from exhaust air from the jet engine exhausts bouncing off the ground and being deflected back upward.

Figure 24:
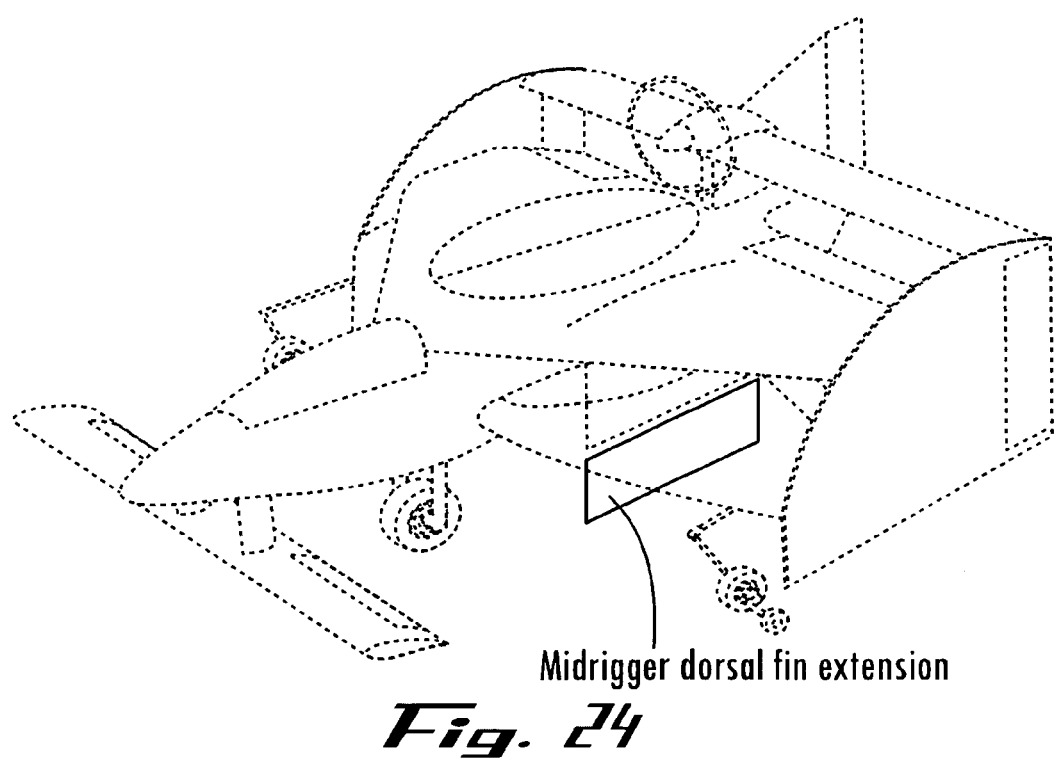
FIG. 24 shows the location of the midrigger dorsal fin extension.

For the Harrier, 4000 pounds of vertical thrust is lost in ground effect if these plates are not mounted. In a similar fashion, the jyrodyne mounts dorsal fin extensions below the bottom wing directly in line with the midriggers. These may be seen in FIG. 24.

Center of Gravity Adjustment Pitch Deflectors

Variations in payload shift the location of the jyrodyne center of gravity, due to the primary payload always being placed forward of the jyrodyne center of lift. In conventional aircraft similar in size to the jyrodyne, payload variations generally occur close to the aircraft's center of gravity and center of lift and need no adjustments to the center of lift. In the jyrodyne, shifts in the payload must be compensated for with shifts in either the jyrodyne center of lift or the jyrodyne center of gravity. In most conventional aircraft, a weight and balance calculation is made to determine where the payload is placed, and then final adjustments are made to the aircraft center of lift, to place the center of gravity close to the center of lift.

Referring to FIG. 3, by enabling fuel transfer between the canard, and two main fuel tanks, after a weight and balance calculation is performed, the jyrodyne can change the fuel location to move the center of gravity to assist the additional trimming of the jyrodyne by moving the center of lift.

For instance, consider the scenario for a takeoff at a heavy payload weight in excess of VTOL takeoff ability using a conventional runway. The jyrodyne can deploy the flaps on the bottom wing for takeoff, which increases the lift from the bottom wing as shown by arrow 7, and thus moves the jyrodyne center of lift forward. At the same time, fuel may be transferred from the canard to the top wing tank, moving the center of gravity rearward, as depicted by arrow 5. The combination of the two activities is required in order to compensate for the large variations in payload which can occur in the passenger compartment, and which are placed well forward of the jyrodyne center of gravity.

The pitch and roll vanes could be used for this function in the VTOL mode of flight, but this would deteriorate hover stability, particularly in low hovers since the shift in the pitch thrust vector would require the entire jyrodyne to be held at a tilt determined by the required weight shift. This is undesirable from the physiological viewpoint; the perspective to the pilot of the jyrodyne orientation for a stable hover would change with the payload. It is preferable for the pilot to always see the same jyrodyne hover orientation.

There are two cases for concern: 1) light payload weights, where the jyrodyne will pitch upward due to not enough weight in the front, and 2) too much weight, where the jyrodyne will pitch downward.

Referring to FIG. 16, to obviate this shift in jyrodyne hover orientation, two pitch deflectors. 42, are mounted vertically at the extreme front of the exbedded duct contained in the center fuselage section. These vanes deploy at light payload weights, reducing the thrust available at the front of the jyrodyne. This compensates for low payload weight. Wile the overall jyrodyne thrust is reduced, this is acceptable since the jyrodyne payload is low, and the excess thrust for lift and climb out remains the same.

The jyrodyne may be trimmed so that for full gross payload conditions, the pitch deflectors are not deployed. At payload weights in excess of the full VTOL payload capacity, the jyrodyne will begin to "wheelbarrow" forward on the nosewheel at the neutral joystick position, warning the pilot of an unsafe takeoff condition under VTOL conditions.

Transitional Flight Regime

There is a brief period of transition from VTOL to conventional flight during takeoff. This is called the Takeoff Transitional Flight. A similar transition occurs during the reverse procedure, when the jyrodyne transitions from conventional flight back to VTOL flight prior to touchdown. This is called Landing Transitional Flight.

Takeoff transitional flight begins with the jyrodyne tilting the plane of the ducted fan rotor forward. In the preferred embodiment, this converts about 7% of the rotor thrust vector to forward flight and causes the jyrodyne to accelerate. As it accelerates, lift at the front of the ducted fan shroud increases due to the increased velocity, while lift is reduced at the rear entrance to the ducted fan, due to the air being sucked into the fan against the forward movement of the jyrodyne. This is the pitch up phenomena described earlier as extra front quadrant lift, and reduced rear quadrant lift. When engine power is applied to the tractor or pusher propeller, the high thrust line over the jyrodyne center of gravity forces the nose down, and helps the aerodynamic controls working to minimize the pitching up effect.

However, another nose down effect is more subtly produced. The tractor or pusher prop also begins to accelerate the air over the top rear section of the ducted fan backwards. This overcomes the tendency of the air to be drawn backwards and down into the rear section of the ducted fan. The tractor or pusher propeller thus increases the rear quadrant lift discussed earlier. This further helps to reduce the pitch up common to earlier ducted fan aircraft.

The use of a tractor or pusher propeller directly over the rear quadrant of the ducted fan is an improvement over Patent U.S. Pat. No. 6,170,778 B1, which places a pusher propeller at the extreme rear of the aircraft subject of that patent. The vertical plane of the pusher propeller is behind the duct a distance of over 50% of the duct diameter. Duct suction isokinetic profiles of constant velocity are in the shape of slightly flattened hemispheres drawn around the duct inlet perimeter. Suction velocities drop off at the third power of the distance from the cross sectional plane of the duct inlet. The pusher propeller location is so far behind the duct that it can draw only a small fraction of the air into it from the rear quadrant of the duct. The jyrodyne tractor or pusher propeller by comparison, lies directly over the rear lip of the ducted fan, and can draw substantially more of the air over the rear quadrant of the ducted fan. Thus, the location of the tractor or pusher propeller on the jyrodyne will be three to four times as effective contributing to rear quadrant lift as the pusher propeller subject of Patent U.S. Pat. No. 6,170,778.

Landing Gear Configuration

The preferred embodiment of the jyrodyne requires an unusual bicycle-type of landing gear configuration, with the nosewheel and tail wheel mounted along the longitudinal axis of the jyrodyne fuselage.

High angle of descent conventional flight landings are possible with the jyrodyne, particularly when in the canard stalled full flap, drooped aileron configuration of the preferred embodiment. These angles of descent may be several times steeper than the typical 3–7° typical of conventional landings, but require a different flaring technique upon touchdown, that arrests the jyrodyne sink rate using ducted fan thrust instead of a conventional flare to landing. Landing tests with radio controlled jyrodyne often failed a conventional nosewheel which was part of a tricycle gear-based arrangement. This was due to the long moment arm from the center of gravity to the required nosewheel placement.

Attempts at the use of the conventional taildragger arrangement failed for reasons that follow.

Taxi tests utilizing the quick application of full power for either conventional tricycle or taildragger-type landing gear proved to have unacceptable stability in crosswinds or turns. The Harrier-type landing gear with a much larger nosewheel than normal, and a larger tailwheel proved to work, but required significant modification to the two-stage outrigger landing gear placement to prevent the jyrodyne from nosing over to the side during hard acceleration or sharp left and right turns during full power applications to the tractor or pusher propeller. This particular problem developed during initial taxi tests with radio-controlled models, which showed that the placement of the outriggers under the wings as is done in conventional practice would not work. Further tests with the outriggers extended forward of the bottom wing on stalks did prevent the prior problem with noseovers. These stalks are illustrated in FIG. 1, above the wheels indicated by arrow 105.

Figure 1:
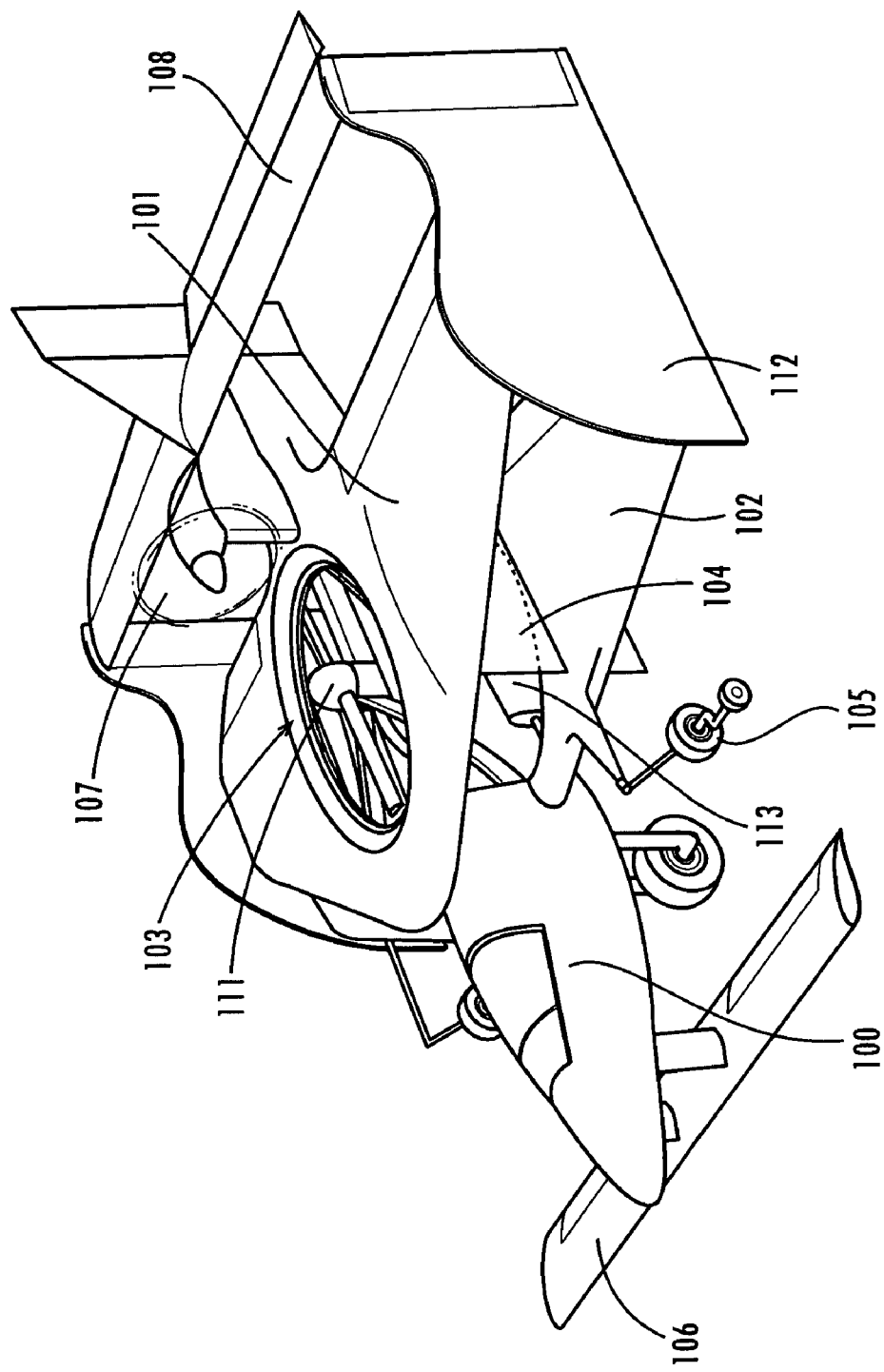
FIG. 1 is an oblique view of the jyrodyne viewed from above.

Referring to FIG. 1, in the preferred embodiment, the two-stage outrigger landing gears, 43, are located on extensions forward of the bottom wing, to move their point of contact with the ground much further forward to prevent the jyrodyne from nosing over in sharp turns at takeoff power settings due either to pilot input or a strong crosswind gust. This also enhances stability in tight turns to the left or right. This extension forward of the outriggers moves them a distance forward as a percentage of the nosewheel to tailwheel wheelbase length of a range of 15–25%.

The entire landing gear system is designed to first level the jyrodyne when landing in one wing low attitudes, and then compress the gear linearly, increasing the spring rate up to a 10 G rate when the gear has become completely compressed. With this design, vertical descents to the ground without flare at rates up to 1200 fpm can be accommodated without serious damage to the jyrodyne or exposing the passengers to in excess of a 10 G deceleration rate.

Two-Stage Outrigger Landing Gear Configuration

As a VTOL aircraft, touchdown characteristics for the jyrodyne are different than conventional aircraft. The two-stage outrigger landing gear is designed to contact the ground before the main landing gear does, in order to help level the jyrodyne as it touches down. A sideward movement in the jyrodyne just prior to touchdown requires that the outrigger landing gear provide full swiveling capability. This is to prevent a "digging in" or excessive lateral resistance which could flip the jyrodyne over. However, fill swiveling capability in two-stage outrigger landing gear provides insufficient lateral resistance to motion to help fight crosswinds or initiate turns. Reference patent supplied by patent office.

In order to minimize these inherent deficiencies of full swiveling two-stage outrigger landing gears for VTOL landings, the two-stage outrigger landing gear on the preferred embodiment consists of a two-staged gear arrangement, where the first stage is a smaller, smooth-tread, full swiveling, trailing-link type wheel, 105. The spring rate on this first-stage gear is designed to go to full deflection producing a 0.5 G (½ the acceleration due to the force of gravity) loading on the first stage wheel. This part of the two-stage outrigger landing gear contacts the ground first to level the wings as a trailing link-type full swiveling gear, and then as the second stage, a second, non-swiveling, grooved or treaded wheel, contacts the ground upon full deployment of the first stage tailing-link full swiveling wheel. In the preferred embodiment, fill deployment of the second wheel requires 3–5 times the vertical downward force as the first wheel, and assists in forcing the jyrodyne around in tight turns and against crosswinds, through the use of brakes. Thus, the spring rate for the second stage outrigger gear will vary from 1.5 G to 2.5 G at full deflection.

An added benefit of the two-stage gear provides much improved wing leveling on takeoff for STOL takeoffs under gusty or crosswind conditions.

Maingear Deflection

Referring to FIG. 2, the nosegear, 210, and referring to FIGS. 7A and 7B, the tailwheel, 17, are contained in the fuselage. These two landing gear components are defined as the maingear, and are arranged in a bicycle-type of arrangement.

The nosegear and tailwheel spring rates are similar to conventional aircraft gear, but with a linear increase to a maximum 4–5 G spring rate at full deflection. With the outriggers, nosegear and tailwheel fully depressed, the deceleration rate of the fuselage at maximum gear deflection will be a full 10 G's. Since the outriggers are located out on the wings, they help prevent the wings from experiencing G forces in excess of their 5 G design during the fully depressed deceleration rate. In the preferred embodiment, the nose gear and tailwheel do not begin to contact the ground until after the first stage outrigger wheel is deployed to ½ of its fully deflected position.

Amphibious Operations

The jyrodyne is suited to conventional amphibious operations, due to the location of the tractor or pusher propeller above and behind the fuselage that is used for conventional flight. Conventional water takeoffs and landings are possible with the proper flotation devices substituted for the landing wheels. Substitution of fixed amphibious floats for the nosegear, outriggers and tailwheel may be performed in the conventional manner, and will allow conventional and STOL takeoffs and landings from water or land.

Personnel Seating

The Blackhawk Army helicopter pilot seats can collapse at a controlled rate a fill foot into a hole underneath the seats at G loadings of 11 G's. This distance allows the absorption of crash deceleration forces over a distance where the G forces can be controlled to a survivable level. Similar concepts apply to the collapsing seating design for current Robinson helicopters. The same principle is applied to the seats in the jyrodyne.

The structure of the seats is designed to provide a two stage collapsing mechanism by careful design of the seating structural members. The first stage collapse allows the back of the reclined seat to fail first, causing the pilot to recline to a more horizontal position. This also reduces the vertical angle of the impact deceleration on the spine to lower values than if the seat simply collapsed with the pilot in an upright seating position such as in the Blackhawk design.

Once the pilot has collapsed to a more or less reclined position, the seat failure loads increase linearly from 10 G's to 30 G's. In a reclined position this deceleration rate can result in some minor injuries but allows for the absorption of the full force of a downward flat spin type of controlled descent of 40 fps in 40–50 milliseconds over a distance of 12–15 inches. The material used for this is a very low weight aluminum honeycomb, with a compressive strength of 10–20 psi.

Figure 21A:
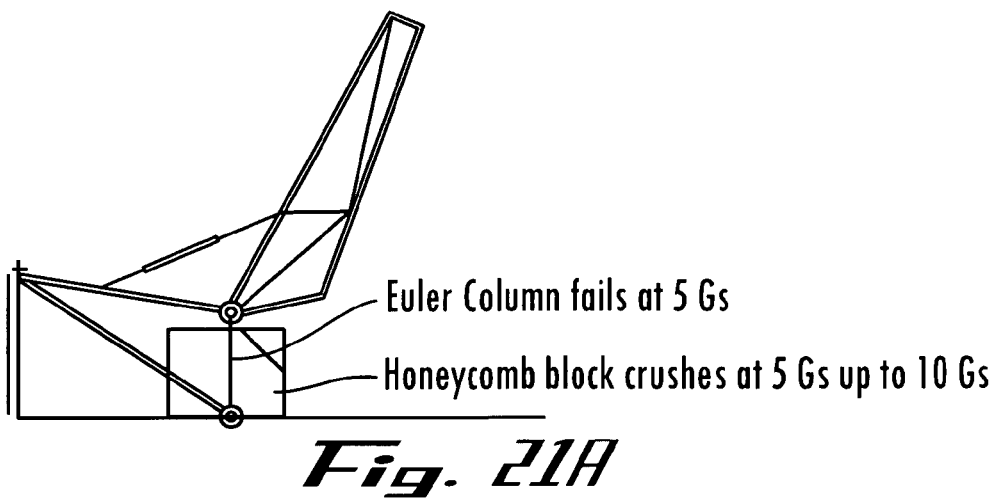
FIGS. 21A-21C illustrate the collapsing seat arrangement for controlled collapse during high G load crashes.
Figure 21B:
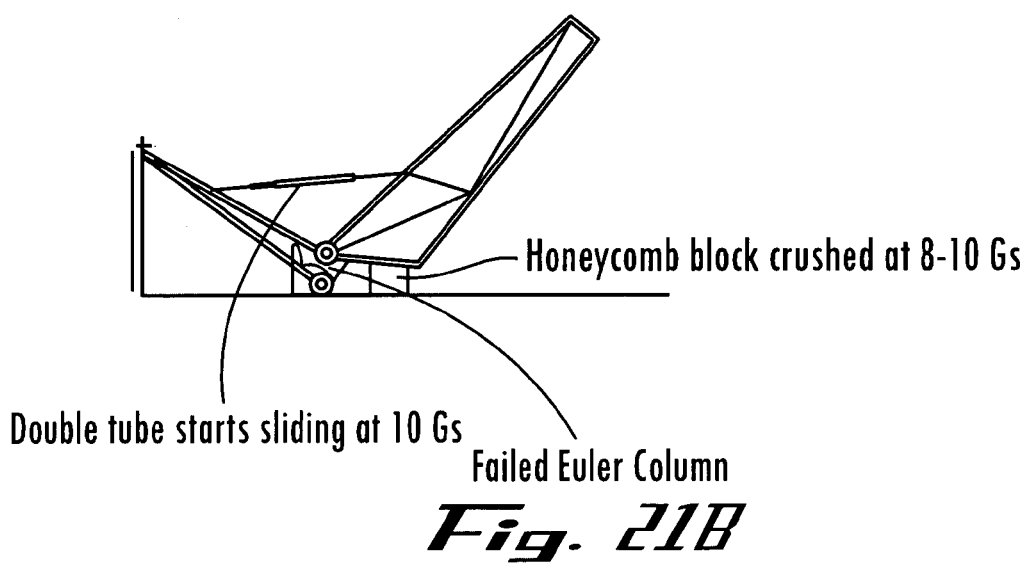
Figure 21C:
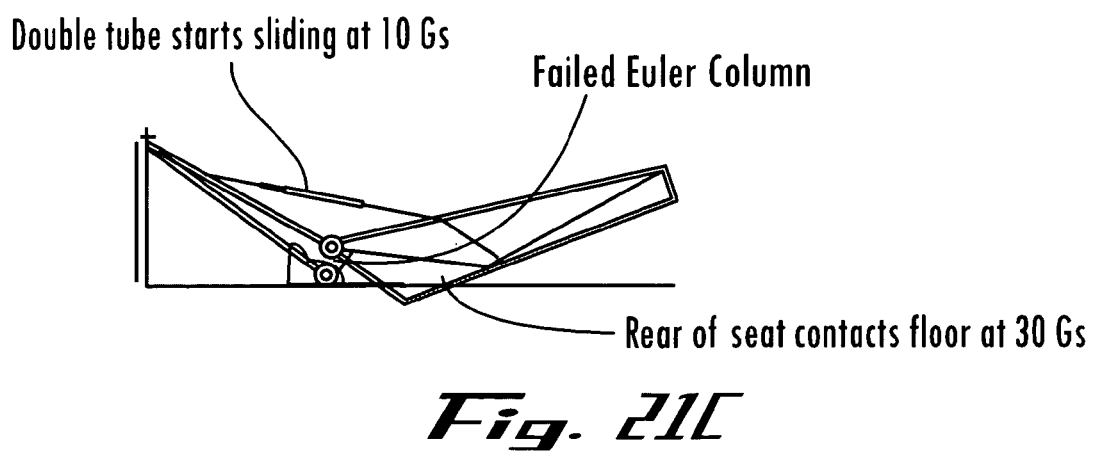
Figure 22A:
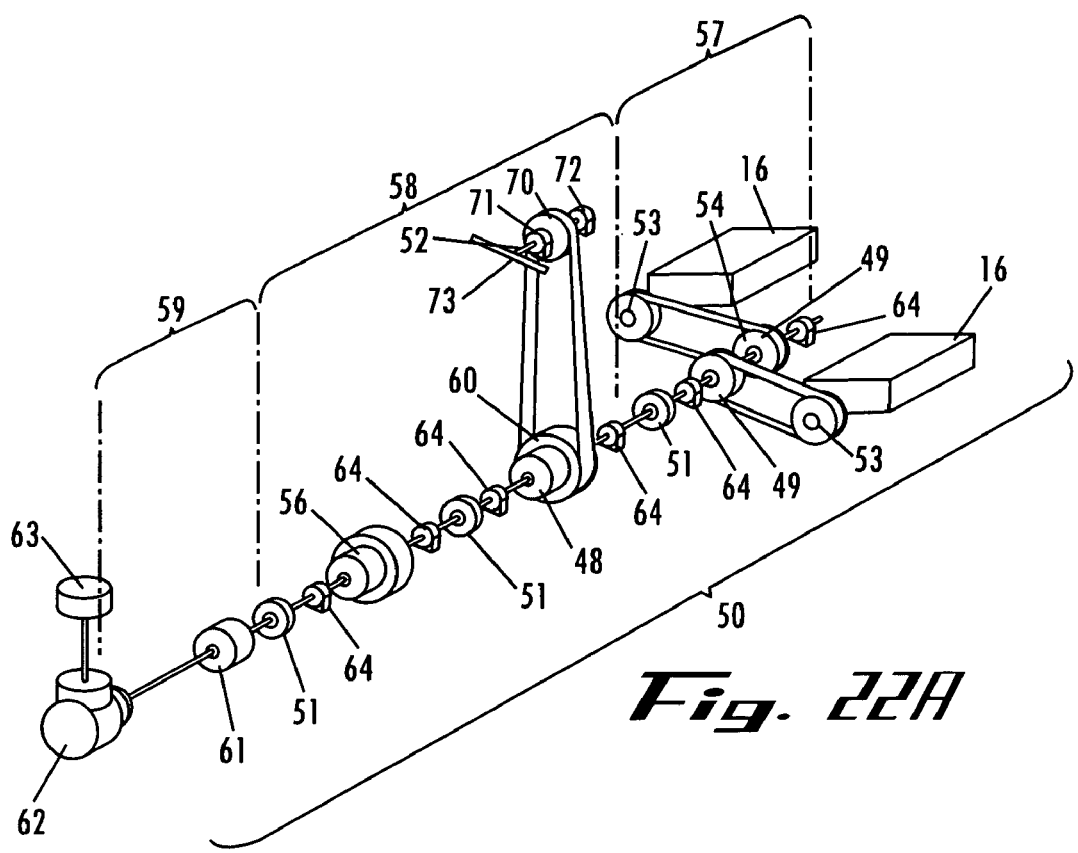
FIGS. 22A and 22B compare the number of drivetrain components required for the jyrodyne prototype and a turboprop powered version.
Figure 22B:
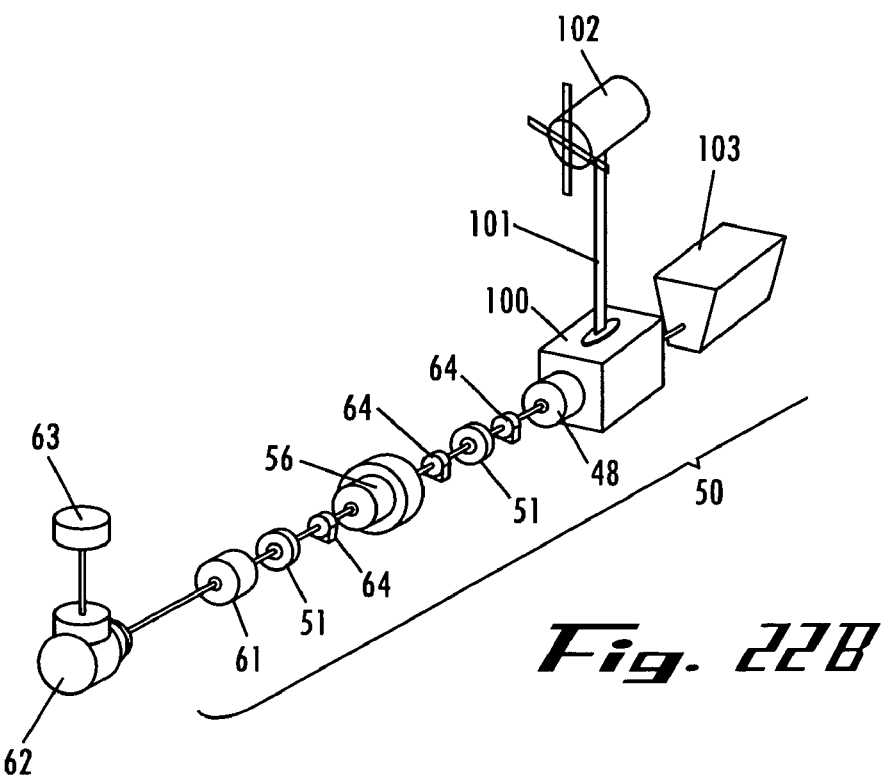

The mechanism for the controlled failure of the passenger seats is best illustrated in the attached drawing, called FIGS. 21A-21C. The collapse of the passenger seats occurs only during straight or nearly straight vertical deceleration of the jyrodyne passenger compartment, unlike the more horizontal deceleration that generally occurs in conventional aircraft. During horizontal deceleration, the seats do not collapse, and the passenger is restrained by a conventional shoulder harness as is typical in aircraft and automobiles. Deceleration for forward conditions is controlled by the collapse of the forward structure of the jyrodyne. G loads are based on a standard, 170 lb. passenger.

The first stage in the collapse occurs by the Euler-type buckling failure of a column. In this case, the column consists of the vertical member of the seat support at the back two sides of the seat frame. These columns are designed to fail at a 5 G load, and will cause the seat to rotate down and backward, while the front edge of the seat remains stationary. The rear part of the seat is then supported by the first of two crushable blocks of honeycomb or other material, which crushes further at a controlled rate of 5 G's until it is compressed. The 5 G load was selected as that where aircraft designed for the normal category can start to undergo structural damage, and the seat failure after a hard landing provides the pilot with an initial indication that an jyrodyne structural inspection is necessary.

Once this occurs, if the passenger is exposed to a further increasing G load, the second step of the collapse occurs. The second step of the collapse starts when the G load reaches 10 G's, which is about the point where vertebrae damage starts when the human body is in the vertical position. The double tube side braces that hold the seat back to the seat bottom will start to slide, allowing the hinged seat back to fall backwards. This will tend to put the passenger into a more reclined position, where the G forces may be more easily accepted without injury. The double tube side braces will continue to slide accepting a 10 G load, until the seat back inclines to an angle of about 30° with the horizontal. At this point, the seat back contacts a second crushable block of aluminum honeycomb, which begins to accept increasing G loads and fails progressively at a rate increasing from 10 to 30 G's. This is to prevent reclining the seat backs onto the laps of the rear seat passengers.

Engines and Drivetrain

FIG. 17 illustrates the drive train layout for the preferred embodiment described in the following text.

The engines used in the radio controlled models were 2-stroke methanol/nitromethane fueled aircraft engines of from 1.08 to 1.8 cu. in. displacement producing from 2–4 horsepower in models weighing from 10 to 12 pounds.

The prototype jyrodyne contains two F30 Hirth two stroke engines, 16, attached with toothed belt sprockets, 49, to a main driveshaft, 50, to produce 190–200 hp delivered to the ducted fan rotor hub, 63.

Figure 19:
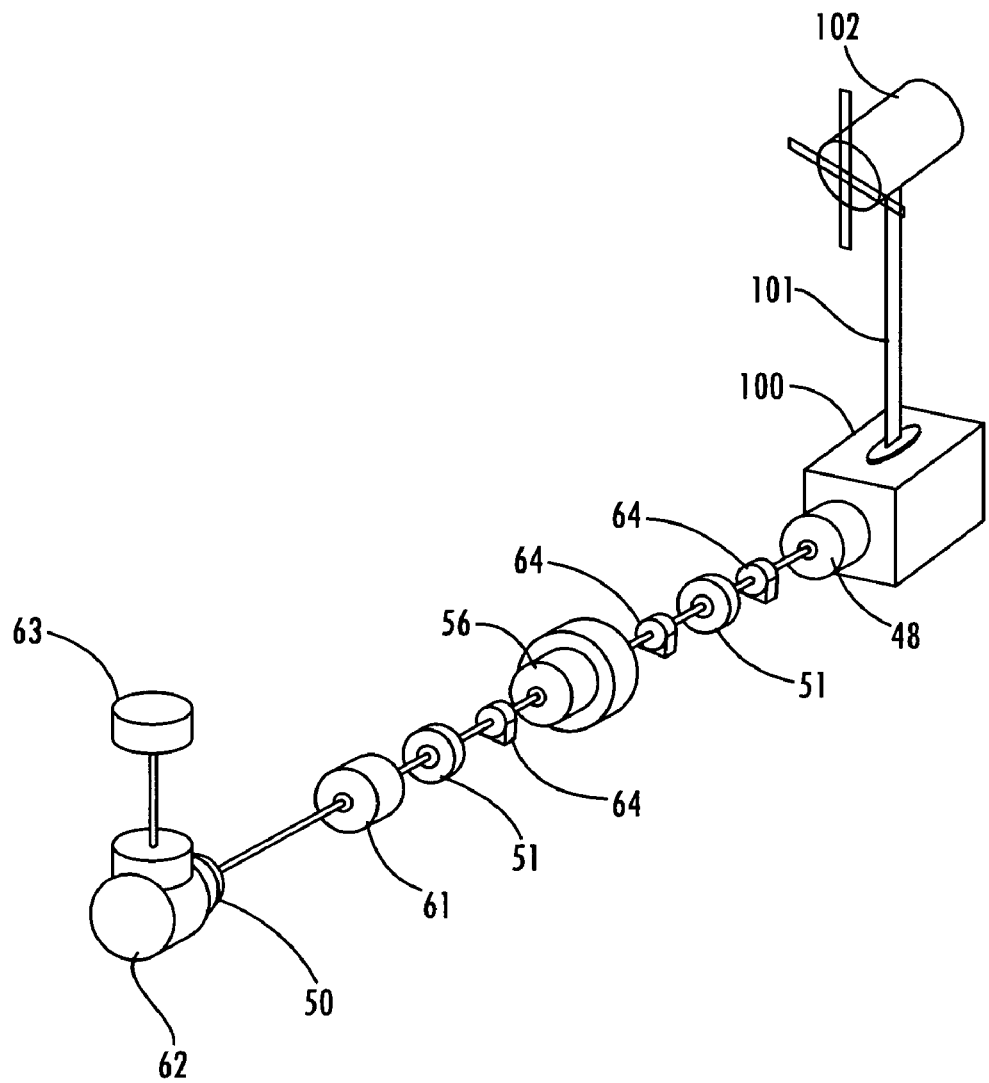
FIG. 19 illustrates the drivetrain arrangement for a turboprop engine installation in the jyrodyne

An alternate drivetrain configuration may be seen by referring to FIG. 19. A turbine engine, 102, may be substituted for the pylon mounted tractor or pusher propeller used for forward flight. If used as a turboprop jet engine, it will drive its own propeller, and supply power via a gearbox and interconnecting shafting to the main driveshaft through another gearbox. The conventional flight clutch, 48, is eliminated, substituted for by a variable pitch propeller mounted on the turboprop jet engine. In VTOL mode as the clutch pedal is depressed, the turboprop jet engine's propeller goes into a flat, low pitched mode, where it produces little thrust and consumes little horsepower. This prop pitch change is effected in the conventional manner utilized on conventional aircraft with constant speed propellers. In conventional flight, the VTOL clutch, 56, is disengaged.

A turbofan jet engine may be used instead of the turboprop jet engine as an alternate, with a jet engine configuration used for forward thrust rather than a propeller. VTOL flight is effected using a gearbox and power takeoff shaft from the turbofan jet engine, and directing that to the main driveshaft as described above. Such a configuration has the potential for supersonic flight.

Main Driveshaft

Referring to FIG. 17, in the prototype the main driveshaft, 50, is a series of three standard 1⅝" aluminum shafts. The three sections are separated by "soft" couplings, 51, with the coupling material made of a hard plastic, to allow ease of maintenance on the other drivetrain components, and to soften the transmission of torque pulses between the engine and propeller or rotor. The driveshaft supports the two driveshaft sprockets, 49, which connect to the individual motors, 16. The engines have flanged drive sprockets 53, mounted on their crankshafts. Said driveshaft sprockets mounted on the main driveshaft have internally mounted Sprag-type overrunning clutches. 54, to allow one engine to continue to run in the case of a single engine failure. Thus, in the event of an engine failure, the stopped engine can freewheel while the other engine continues in operation.

In the full sized embodiment, once airborne in the VTOL mode, the jyrodyne is tilted forward to develop forward momentum. At a forward speed of 20–30 mph, the power from the engines is smoothly but quickly transferred from the ducted fan rotor in the exbedded ducted fan to a tractor or pusher propeller mounted above the rear of the exbedded ducted fan.

This is accomplished in 2–5 seconds using two shaft mounted, multi-disc pneumatic clutches, 48 and 56. One of these clutches controls power transmission to said tractor or pusher propeller used for forward flight; this is called the conventional flight clutch, 48. The other clutch, called the VTOL clutch, 56, controls power transmission to the ducted fan rotor, which is part of the exbedded ducted fan.

The three driveshaft sections comprise: 1) the engine section, 57, 2) the clutch section 58, and 3) the gearbox section, 59. The engine section contains the two sprockets for the engine belts connecting to the driveshaft. Said clutch section is connected first to the bottom propeller sprocket, 60, containing the conventional flight clutch, 48, and passes through this clutch to the VTOL clutch, 56. The VTOL clutch is attached conventionally to the clutch section of the driveshaft, 58, on one side, and then to the gearbox section of the driveshaft 59, going to a Flexidyne coupling, 61 the bevel gearbox, 62 and the rotor thrust bearing, 63.

Conventional Flight Clutch

The main driveshaft connects to and passes through the conventional flight clutch, 48, which is mounted inside the bottom propeller sprocket 60.

The clutch required is a multi-disc, through-shaft clutch mounted inside a toothed and flanged sprocket, called the bottom propeller sprocket. Said sprocket attaches to a reinforced rubber toothed belt to transmit the power to said tractor or pusher propeller mounted above said sprocket. Said propeller is mounted on a separate driveshaft, called the propeller driveshaft, 52. Said sprocket is thus either engaged or disengaged from the sprocket section of the driveshaft, 58, which in turn engages or disengages said propeller from the driveshaft. When the conventional flight clutch inside the bottom propeller sprocket is disengaged, the engine power in the driveshaft passes through said sprocket and clutch and supporting members to a bearing, 64 and coupling, 51, and then to the VTOL clutch, 56.

VTOL Clutch

The main drive shaft extends through the multi-disc conventional flight sprocket clutch, 48, to another multi-disc clutch, 56. This clutch has no through shaft feature, and does not mount a sprocket. It acts in a manner similar to a conventional automotive-type clutch, but acts in a manner reverse that of the automotive clutch. Most of the time of operation this clutch is disengaged, rather than engaged.

Operation of the Clutches

In operation, the conventional flight sprocket clutch, 48, is disengaged, and the VTOL flight clutch is engaged for VTOL takeoff. Once airborne, the jyrodyne is tilted forward 2–5°. This causes the jyrodyne to accelerate forward. Once the jyrodyne has accelerated to between 10 and 30 mph, depending on conditions, the conventional flight sprocket clutch, 48, is engaged slowly over a period of typically 2–5 seconds. This transfers the engine horsepower from the exbedded ducted fan rotor to the said propeller. Lift from the wings develops in slow speed forward flight to offset the horsepower transferred from the ducted fan rotor to said propeller.

At the same time, as the jyrodyne accelerates and begins to produce wing lift, the VTOL clutch, 56, is disengaged, and the engine power is reduced to match forward airspeed requirements.

Figure 18:
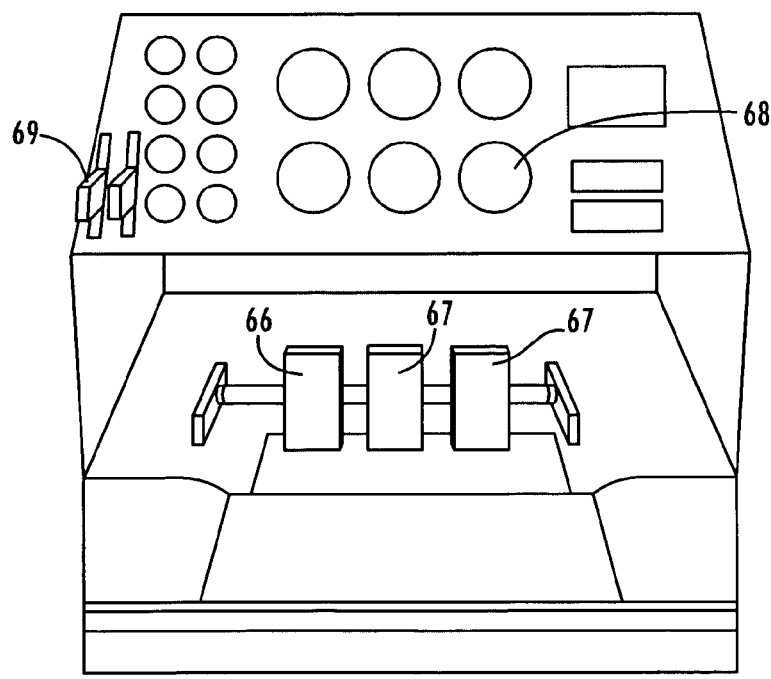
FIG. 18 illustrates the new pilot control arrangements used in the jyrodyne to control the transitional use of the ducted fan rotor and tractor or pusher propeller

As the clutch surfaces wear over time, proper activation of the clutch pedal will require adjustment for the two clutches. Referring to FIG. 18, this is performed by moving the two levers, one denoted by 69, at the left of the instrument panel, 68. Moving the lever up causes the clutch to engage sooner, and vice versa. In this manner, smooth engagement of one clutch while the other clutch is disengaging will prevent the engines from either overrunning due to too little load, or bogging down to too much load.

A more complete depiction of the operation of the clutches and levers is shown in FIGS. 20A-20E.

Positioning of the levers is not important, and is up to the discretion of the pilot. The levers may be located as shown on the instrument panel, or may be mounted in a convenient location at the ceiling, on the fuselage sidewall next to the pilot on his left, or even on the floor.

Propeller Driveshaft

Referring to FIG. 17, this is a short shaft, 52, mounted above the top of the fuselage, at the rear of the ducted fan shroud inlet bellmouth in the top wing, which contains a belt sprocket, 70, mounted between two bearings, 71 and 72, and an overhung tractor propeller, 73.

Bevel Gearbox

A conventional spur geared 90° beveled gearbox, 62, with a gear ratio in the 1.5 to 1 range is used to transmit the engine power to the ducted fan rotor at the correct rpm. For the preferred embodiment, the rotor RPM is 1600.

Dry slip coupling

The gearbox is isolated from the rest of the drivetrain by a Flexidyne-type dry slip coupling, 61. This coupling dampens the potential torque pulses between the engines and ducted fan rotor, and was used in the Teal experimental and Aerocar certified aircraft which used pusher propellers mounted on long shafts.

Clutch control and activation

Referring to FIG. 18, the clutches are controlled using a floor-mounted foot pedal, 66, similar to that used in automotive service. This pedal is located to the left of the rudder pedals, 67, used for conventional flight. The preferred clutch mechanism is a floor mounted unit, in order to allow the pilot to have both hands free for joystick and throttle control, but the clutch activation mechanism could also be a sidewall mounted lever or knob, or an instrument panel lever or knob. The clutches are activated pneumatically.

Referring back to FIG. 17, when the foot pedal is fully depressed, only the VTOL clutch, 56, is engaged. When fully released, only the conventional flight sprocket clutch is engaged 48.

An alternate to pneumatically operated clutches is electrical or hydraulic clutch activation.

Although the inventor has described a preferred embodiment for the present invention, that embodiment is given only as an illustration of the best mode of implementation, and should not limit the scope of the present invention. Many modifications of the present invention may be made within the scope of the present invention. The present invention should, therefore, be limited only by the appended claims and their legal equivalents.

I claim:

1. An aircraft capable of both conventional and vertical take off and landing (VTOL) flight comprising:
   a fuselage;
   a set of canard wings mounted at or below the fuselage at the front of the aircraft;
   two sets of wings, including a bottom wing and top wing mounted in biplane fashion, the bottom wing mounted so that the wing center of lift is located slightly ahead of the aircraft center of gravity, the top wing mounted so that the top wing center of lift is located slightly behind the aircraft center of gravity, and the bottom wing and top wing mounted so that the combined center of lift from the bottom wing and top wing is at the aircraft center of gravity;
   an exbedded ducted fan mounted in a large circular opening in the center of said top wing wherein exbedded means the duct diameter extends beyond the outer edge of the fuselage at the center of the top wing, the exbedded ducted fan including a shroud having a ducted fan bellmouth and a rotor disposed in the shroud, said bottom wing having a central opening for the exhaust airstream from the ducted fan and said central opening extending rearward and being larger than the circular opening in the top wing;
   a horizontal stabilizer mounted to the rear and above the top wing;
   a central tailfin mounted above and behind the ducted fan bellmouth and supporting the horizontal stabilizer, said central tailfin mounted on top of the rear third of the fuselage to form a "T" tail with the horizontal stabilizer; and
   a first rudder mounted in the central tailfin.

2. The aircraft of claim 1, wherein said horizontal stabilizer has a surface area ranging between 25% to 60% of the biplane wing surface area.

3. The aircraft of claim 1, wherein said central tailfin has a total surface area ranging between 25% to 60% of the biplane wing surface area.

4. The aircraft of claim 3, wherein the first rudder mounted in the central tailfin has a total surface area ranging between 25% to 60% of said total surface area of the central tailfin.

5. The aircraft of claim 1, further comprising:
   two near vertical, airfoil-shaped planar support structures called sidefins connecting said biplane wings together at the wingtips, said two sidefins extending to further connect to the wingtips of the horizontal stabilizer; and second and third rudders mounted in each of the two sidefins.

6. The aircraft of claim 5, wherein said central tailfin and two sidefins have a total surface area ranging between 25% to 60% of the biplane wing surface area.

7. The aircraft of claim 6, wherein the first, second, and third rudders have a total surface area of ranging between 25% to 60% of said total surface area of the central tailfin and two sidefins.

8. The aircraft of claim 5, further comprising a vertically oriented propulsion shaft connected to the rotor, said propulsion shaft projecting downward into the center of the fuselage and located at the aircraft center of lift of the biplane wings and at the aircraft center of gravity, to provide vertical lift propulsion; wherein:
the exbedded ducted fan shroud has an inside diameter extending beyond the diameter of the fuselage;
the ducted fan shroud bellmouth having a radius of up to 0.3 times the ducted fan diameter;
the ducted fan shroud being a direct structural support for the top wing, and indirectly for the bottom wing.

9. The aircraft of claim 8, further comprising fin control over pitch, yaw and roll while in VTOL mode including:
center of gravity adjustment pitch deflectors to provide for adjustments to the center of VTOL lift;
exbedded airpath roll/yaw control vanes to provide aircraft control of yaw and roll while in the VTOL mode of flight, said vanes mounted outside the fuselage while inside the diameter of the ducted fan;
imbedded and canted pitch control vanes to provide aircraft control of pitch while in the VTOL mode of flight; and
three to four mid-section anti-torque airfoil-shaped vanewings, providing horizontal thrust to create a torque effect opposite to that produced by the aircraft engines and ducted fan rotor.

10. The aircraft of claim 5, further comprising airfoil-shaped, near-vertical wing support panel structures called midriggers connecting said biplane wings to each other, said midriggers positioned longitudinally tangent to the outer radius of the large circular opening in the center of said top wing.

11. The aircraft of claim 10, further comprising horizontal propulsive means to provide forward motion.

12. The aircraft of claim 11, wherein said horizontal propulsive means comprises a tractor propeller mounted over the rear section of the ducted fan shroud bellmouth to assist aerodynamic controls in compensation to the pitch up experienced in ducted fan aircraft in the transition from VTOL to conventional flight.

13. The aircraft of claim 12, further comprising aerodynamic controls for a transitional flight regime comprising:
a three control surface elevator including a central third section between two outer third sections, the three control surface elevator covering the full wingspan of the aircraft, the central third of the elevator being in the slipstream of the tractor to be used to enhance aircraft stability in pitch during engine throttle adjustments in a conventional flight regime, the two outer third sections acting as conventional elevator surfaces, said elevator having a surface area range of 25% to 50% of the surface area of the horizontal stabilizer to provide satisfactory aerodynamic control of pitch;
flaps on the bottom wing of the biplane set of wings; and
ailerons on the top wing of the biplane set of wings, said bottom wing having a rear part and no lifting surfaces on the rear part of the bottom wing inside the midriggers.

14. The aircraft of claim 13, further comprising an engine throttle, wherein the elevator adjusts when the engine throttle changes position to compensate for the downward force on the nosegear of the aircraft impressed by the thrust from the forward propulsion system.

15. The aircraft of claim 14, wherein an incremental change in position of the pitch and roll/yaw control vanes results in a change in position of the throttle to compensate for the increased drag and redirected thrust vector of the vanes.

16. The aircraft of claim 11, wherein said horizontal propulsive means comprises a pusher propeller mounted over the rear section of the ducted fan shroud bellmouth, to assist aerodynamic controls in compensation to the pitch up experienced in ducted fan aircraft in the transition from VTOL to conventional flight.

17. The aircraft of claim 16, further comprising aerodynamic controls for a transitional flight regime comprising:
a three control surface elevator including a central third section between two outer third sections, the three control surface elevator covering the full wingspan of the aircraft, the central third of the elevator being in the slipstream of the pusher propeller to be used to enhance aircraft stability in pitch during engine throttle adjustments in a conventional flight regime, the two outer third sections acting as conventional elevator surfaces, said elevator having a surface area range of 25% to 50% of the surface area of the horizontal stabilizer to provide satisfactory aerodynamic control of pitch;
flaps on the bottom wing of the biplane set of wings; and
ailerons on the top wing of the biplane set of wings, said bottom wing having a rear part and no lifting surfaces on the rear part of the bottom wing inside the midriggers.

18. The aircraft of claim 17, further comprising an engine throttle, wherein the elevator adjusts when the engine throttle changes position to compensate for the downward force on the nosegear of the aircraft impressed by the thrust from the forward propulsion system.

19. The aircraft of claim 18, wherein an incremental change in position of the pitch and roll/yaw control vanes results in a change in position of the throttle to compensate for the increased drag and redirected thrust vector of the vanes.

20. The aircraft of claim 11, wherein said horizontal propulsive means comprises a turbofan jet engine mounted over the rear section of the ducted fan shroud bellmouth, to assist aerodynamic controls in compensation to the pitch up experienced in ducted fan aircraft in the transition from VTOL to conventional flight.

21. The aircraft of claim 11, wherein said horizontal propulsive means comprises a turboprop jet engine mounted over the rear section of the ducted fan shroud bellmouth.

22. The aircraft of claim 5, wherein:
the two sidefins have front and rear edges extending linearly to the front and rear edges of the bottom wing wingtips, respectively, and then to the front and rear edges of the top wing wingtips, and then to the front and rear of the wingtips of the horizontal stabilizer;
the two sidefins have top curvature between the top wing and horizontal stabilizer curved concavely in an "S" shaped curve, to reduce the amount of sidefin area exposed to crosswinds pressing against the sidefins above the aircraft lateral center of gravity; and the two sidefins have dorsal extensions extending below the bottom wing, to add surface area to the sidefins below the aircraft lateral center of gravity, the purpose of the "S" shaped curve and dorsal extensions being to lower the center of pressure of the sidefins to below the center of gravity of the aircraft.

23. The aircraft of claim 10, wherein said midriggers are parallel to the fuselage and airflow, to connect the top and bottom wings for structural support and enhanced vertical thrust, on both sides of the aircraft; said midriggers canted so that the bottom of the midriggers is located further outboard than the top of said midriggers, the angle between a vertical line and the midriggers to be between 3 and 10 degrees.

24. The aircraft of claim 23, wherein the midriggers have dorsal fins extending below the bottom wing to enhance vertical thrust recapture.

25. The aircraft of claim 5, further comprising:
horizontal propulsive means to provide forward motion and either a single engine or two engines driving both the exbedded ducted fan and the horizontal propulsive means; and two clutches to transfer power incrementally between the ducted fan rotor and the horizontal propulsive means, wherein said clutches are mounted with said engines to transmit power through a driveshaft, said driveshaft being mounted on a drivetrain truss.

26. The aircraft of claim 25, wherein the horizontal propulsive means comprises a tractor propeller and transfer of engine power is made using the two clutches, including a first clutch, called the VTOL clutch, to control activation of engine power to the exbedded ducted fan rotor, and a second clutch, called the conventional flight clutch, to control the activation of engine power to the tractor propeller.

27. The aircraft of claim 25, wherein the horizontal propulsive means comprises a pusher propeller and transfer of engine power is made using the two clutches, including a first clutch, called the VTOL clutch, to control activation of engine power to the exbedded ducted fan rotor, and a second clutch, called the conventional flight clutch, to control the activation of engine power to the pusher propeller.

28. The aircraft of claim 27, wherein the two clutches are controlled by a single floor mounted foot pedal and trimmed using two instrument, floor, sidewall or ceiling mounted trim levers for controlling the relative rate of mix of clutch engagement/disengagement between the two clutches.

29. The aircraft of claim 5, further comprising collapsing passenger seats which have a two-stage collapsing mechanism, wherein the rear of the seat fails backward at a G loading of 5 to 10 G's, said collapsing mechanism comprising a Euler column which collapses at 5 G's, an aluminum honeycomb block under the seat collapsing at 5–10 G's, a double sliding armrest support tube collapsing at 10 G's allowing the seat to recline, and once reclined, continuing to fail through the collapse of another higher density aluminum honeycomb at controlled rate of 30 G's deceleration.

30. The aircraft of claim 5, further comprising a main wing fuel tank in the biplane wings and a canard wing fuel tank in the canard wings, wherein fuel in the canard wing fuel tank can be transferred to the main wing fuel tank.

31. The aircraft of claim 10, further comprising:
landing gear comprised of a main nose wheel and a main tail wheel mounted along the longitudinal axis of the fuselage; and two outrigger landing gear mounted on extensions in front of the bottom wings.

32. The aircraft of claim 31, wherein the outrigger landing gear includes outrigger wheels mounted in front of a junction of said midriggers with the bottom wing on both sides of the aircraft and the tail wheel is mounted at the rear end of a drivetrain truss.

* * * * *